United States Patent [19]

Okuyama et al.

[11] Patent Number: 5,262,763
[45] Date of Patent: Nov. 16, 1993

[54] ELECTRONIC DEVICE WITH OPENABLE CASES

[75] Inventors: Masayoshi Okuyama, Higashiyamato; Takashi Kanzaki, Akishima, both of Japan

[73] Assignee: Casio Computer Co., Ltd., Tokyo, Japan

[21] Appl. No.: 780,909

[22] Filed: Oct. 23, 1991

[30] Foreign Application Priority Data

Nov. 19, 1990 [JP] Japan .................................. 2-311575

[51] Int. Cl.$^5$ .............................................. G09G 1/00
[52] U.S. Cl. .................................... 345/87; 368/88; 368/223; 368/276; 345/169
[58] Field of Search ........... 340/700, 716, 717, 815.14, 340/815.15, 765; 368/223, 88, 276

[56] References Cited

U.S. PATENT DOCUMENTS

| | | | |
|---|---|---|---|
| 4,444,513 | 4/1984 | Proellochs et al. ................ | 368/223 |
| 4,554,590 | 11/1985 | Chelin et al. ....................... | 358/254 |
| 4,985,878 | 1/1991 | Yamada et al. | |
| 5,077,551 | 12/1991 | Saitou ................................. | 340/700 |

FOREIGN PATENT DOCUMENTS 0042328 4/1977 Japan .................................. 340/712

*Primary Examiner*—Ulysses Weldon
*Assistant Examiner*—Doon Yue Chow
*Attorney, Agent, or Firm*—Frishauf, Holtz, Goodman & Woodward

[57] ABSTRACT

An electronic device with multiple functions has a base case provided with an input key unit on an upper surface and a plurality of openable cases which are openably mounted on the base case so as to be freely open and closed. The base case has an arced guide thereon. The openable cases are arranged so as to be stacked on the base case when closed. One of the openable cases has a moving member which is movably engaged with the arced guide for connecting the openable case to the base case. The openable cases each are provided with an electro-optical display unit on a rear surface. The openable cases except the outermost openable case each are provided with an input key unit on an upper surface. Data entered through the input key unit provided on the selected one of the openable cases is displayed on the electro-optical display unit on the openable case which is disposed next and upper to the selected openable case, whereby the input key unit and the electro-optical display unit are used which are suitable for a particular function. A detector is provided for detecting the open position of the one case with the moving member thereon, and the display thereof is controlled in accordance with the detected position.

8 Claims, 21 Drawing Sheets

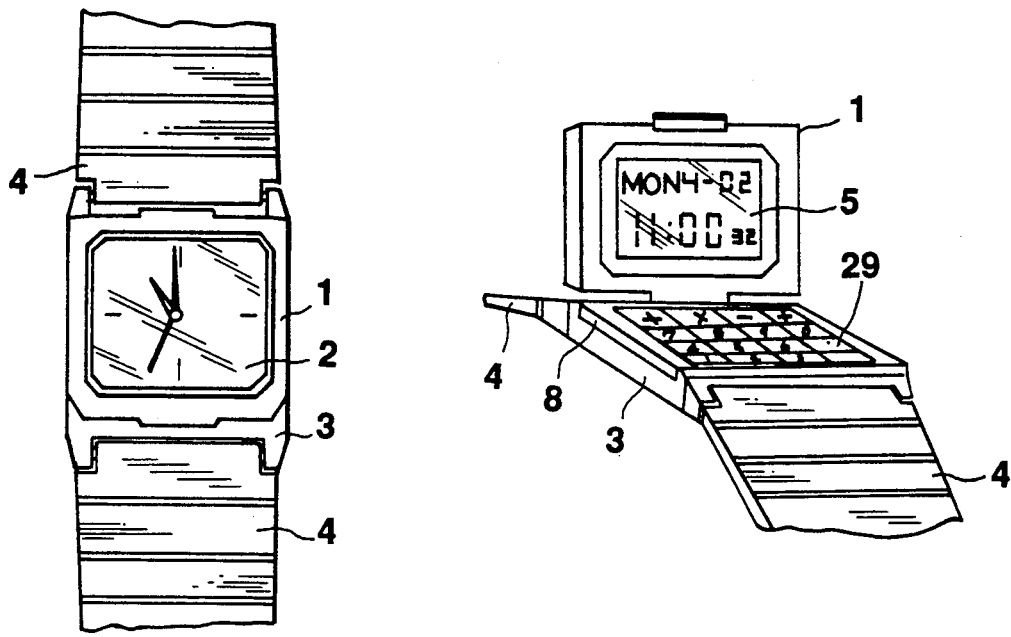
FIG.15A
FIG.15B
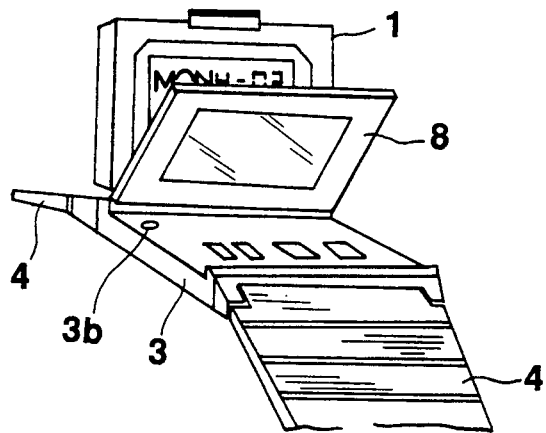
FIG.15C

ELECTRONIC DEVICE WITH OPENABLE CASES

BACKGROUND OF THE INVENTION

The present invention relates to electronic devices with at least two cases attached openably to a base case on which a plurality of keys are provided.

Conventionally, for example, an electronic wristwatch is proposed in which an upper case is attached openably to a lower case with many key input units on an upper surface of the lower case and a display device provided on a lower surface of the upper case to optically display thereon data keyed in by a key input switch unit in order to add to the watch various functions such as a computer function and a data bank function in addition to a time display function, as disclosed in U.S. Pat. No. 4,985,878. Such an electronic wristwatch is capable of displaying the time as well as keyed-in data although it is miniaturized and has high portability.

The shape of the display elements of the display device and the number of keys required by the respective functions vary with function. For example, if such a device displays only numerical data such as that required by the time display and alarm time functions, the display device is required to have only numerical display elements comprising seven segments disposed in the form of 8. However, if alphabets are required to be displayed as in the data bank function, the display device is required to have a plurality of character display elements, for example, Of a 5×5 matrix. In addition, a diagram such as a graph is required to be displayed, the display device is required to have a matrix of many dot display elements disposed all over the display plane thereof. If numerical display elements or character display elements are to be provided, the number of figures for data to be displayed varies with function, so that the number of display elements required to be provided on the display device varies with function.

The number of keys required for control of various functions varies with function. If many keys are required, they are individually required to be miniaturized. If the number of keys is small, the size of each key may be increased so as to achieve improved operability.

However, the display device in the electronic wristwatch disclosed in the aforementioned U.S. Pat. No. 4,985,878 must be constructed so as to be able to display data on all the functions. The key-in switch unit must be constructed so as to be able to control all the functions. Thus, numerical or character display on the display device may be miniaturized or take a strange shape depending on function. All the functions must be controlled using small keys, so that key's operability is low.

If multi-function data is selected and displayed on a selected display, the keying operation is troublesome as well as likely to be mistaken because a function is selected by a small external key.

SUMMARY OF THE INVENTION

It is an object of the present invention to provide a small electronic device with an openable case which is capable of displaying the respective functions satisfactorily and easy to depress keys.

It is another object of the present invention to provide an electronic device with an openable case in which switching and displaying operations are simple and performed reliably.

According to the present invention, a multi-function electronic device comprises a base case having an arced guide thereon and provided with an input key unit on an upper surface of said base case; a first openable case attached to said base case so as to be freely opened and closed, said first openable case being stacked on said base case when closed, and said first openable case being provided with an electro-optical display unit; a second openable case provided with an electro-optical display unit; a moving member, movably engaged with the arced guide on said base case, for connecting said second openable case to said base case such that said openable case is freely openable and closable over said base case, wherein said second openable case is movable to several positions along the arced guide together with movement of said moving member and being freely openable and closable over said base case at said several positions; position detecting means for detecting which position of said several positions said second openable case is located at when said second openable case is closed over said base case; and display control means for allowing different data to be displayed on the electro-optical display unit of said second openable case in accordance with an output of said position detecting means, when said second openable case is open.

BRIEF DESCRIPTION OF THE DRAWINGS

FIG. 15A is a plan view of an electronic wristwatch as a third embodiment of the present invention in which the first and second cases are closed;

FIG. 15B is a perspective view of the FIG. 15A wristwatch in which the first case is open;

FIG. 15C is a perspective view of the wristwatch of FIG. 15A in which the first case is completely open and the second case is half open;

DESCRIPTION OF THE PREFERRED EMBODIMENTS (1) First Embodiment

Figure 1:
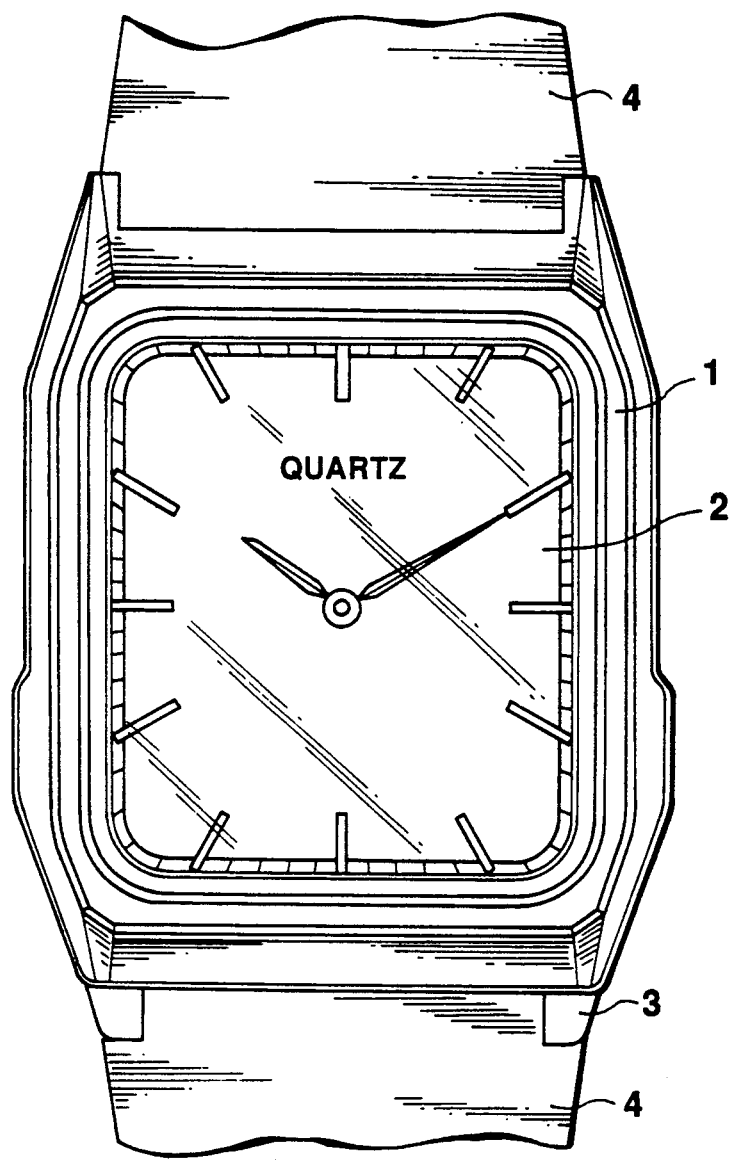
FIG. 1 is a plan view of an electronic wristwatch as a first embodiment of the present invention in which the first case is closed.

An electronic wristwatch as a first embodiment of the present invention will be described with reference to FIGS. 1-5, which show the appearance of the wristwatch. FIG. 1 shows first case 1 and second case 8 (which is positioned under the first case 1 and not shown in FIG. 1) attached by a pin 10, to be described later in more detail, to an input device 3 so as to be openable in the same direction and also superposed on and closed against input device 3. As shown in FIG. 1, pointer display unit 2 is disposed on an upper surface of first case 1 with a watch band 4 attached so as to connect the opposing ends of input unit 3.

Figure 2:
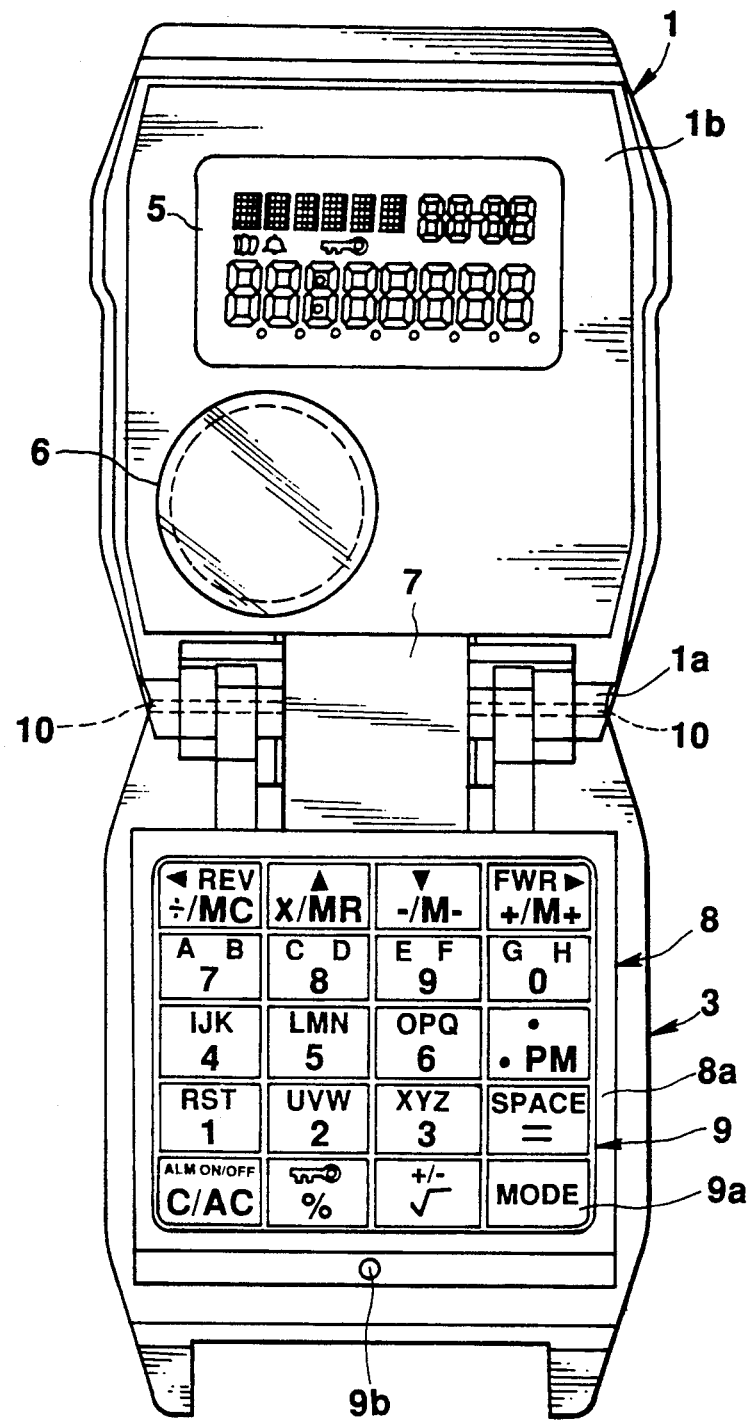
FIG. 2 is a plan view of the electronic wristwatch in which the first case is open.

FIG. 2 shows the wristwatch in which only first case 1 is closed, which is attached openably by pin 10 to input device 3. Disposed on the back side or lower surface 1b of the first case is first display unit 5 which includes six 5×5 dot matrix displays and a 12-figure 8-like liquid crystal display with battery cover 6 provided below first display unit 5 in a left lower portion of first case lower surface 1b. In the same figure, second case 8 is attached pivotally by pin 10 to input device 3 and closed against the input device like first case 1. Sheet switch unit 9 including many switches such as mode switch 9a is provided on an upper surface 8a of the second case. Flexible lead 7 is provided between first and second cases 1 and 8 to connect a control unit and a driver unit (both of which are not shown) of first display unit 5 and an electronic circuit (not shown) in second case 8. A photosensor 9b is provided below sheet switch unit 9 to sense light emitted when the first case 1 is closed.

Figure 3:
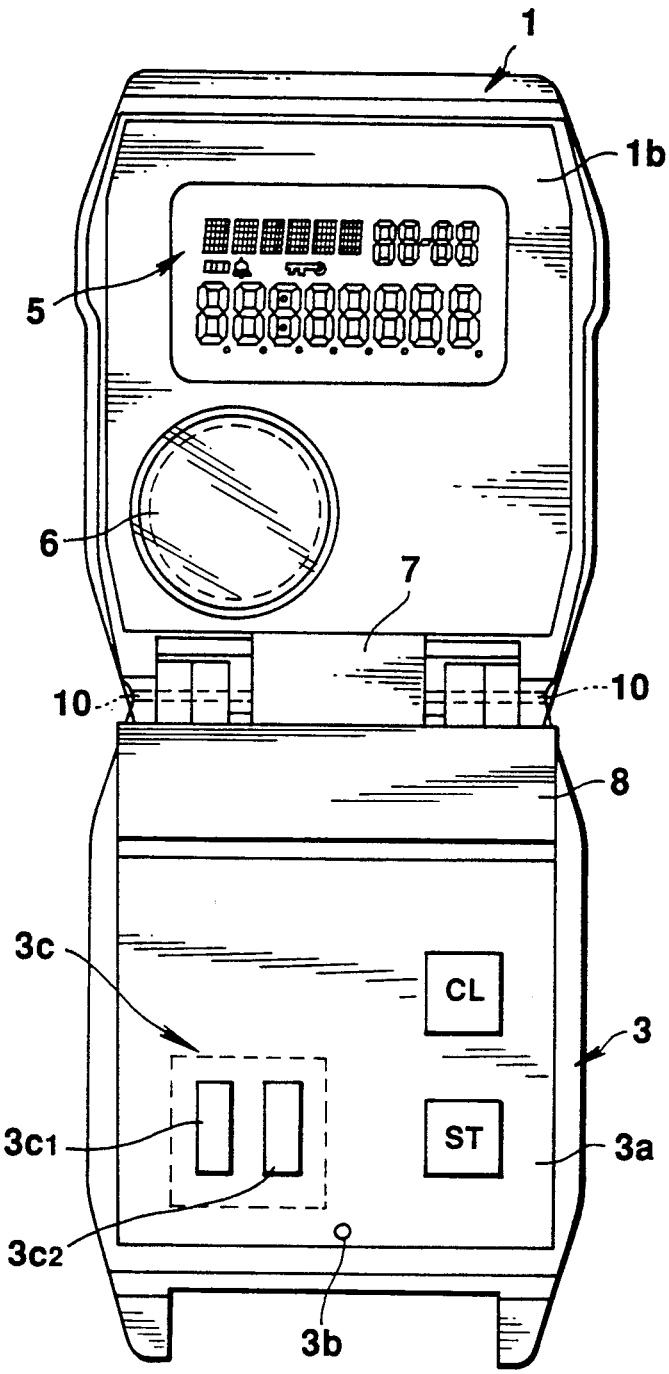
FIG. 3 is a plan view of the wristwatch in which the first case is completely open and the second case is half open.

FIG. 3 shows the wristwatch in which first case 1 is opened and second case 8 is then half opened such that a part of the upper surface 3a of input device 3 appears. As shown in FIG. 3, a pulsation detector 3c which a finger contacts when the embodiment is used as a pulsimeter is disposed on upper surface 3a of input device 3 and includes a light emitter 3c1 and a photodetector 3c2. Light emitter 3c1 irradiates the contacting finger with light while photodetector 3c2 transduce light reflected by the finger to an electrical signal. The pulsations are detected from the electrical signal by the electronic circuit in input device 3 which receives the signal. When pulsations are measured by causing the finger t contact with pulsation detector 3c, start switch ST is operated before that measurement. The present embodiment is capable of maintaining one-month record of daily pulsations measured as mentioned above, which will be described in more later. Clear switch CL is used to erase the record. A photosensor 3b is disposed at a lower central end of upper surface 3a of the input device 3 to detect the light emitted when second case 8 is opened to thereby detect this opening.

Figure 4:
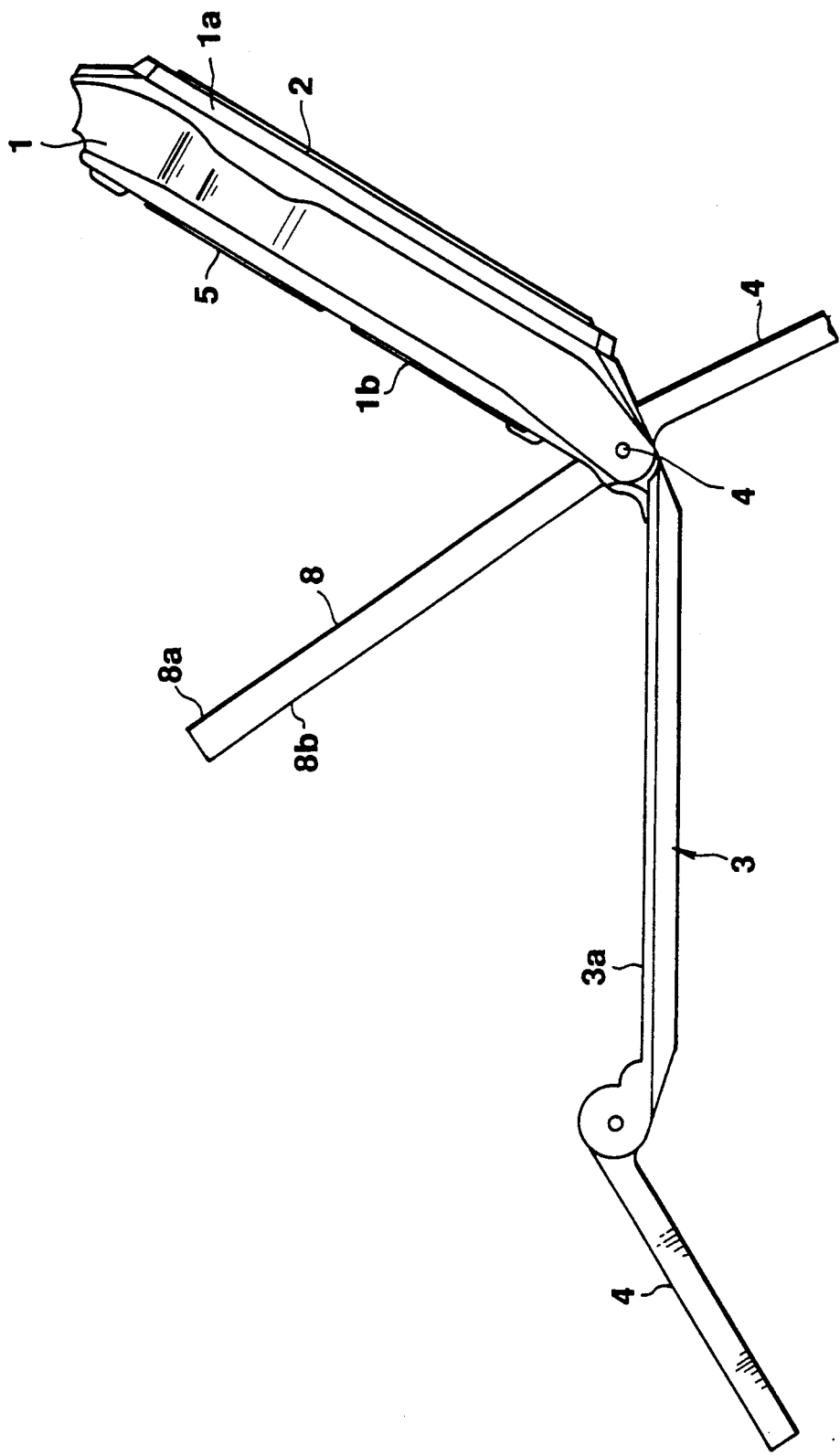
FIG. 4 is a side view of the wristwatch in which the first case is completely open and the second case is half open.

FIG. 4 is a side view of the wristwatch in which first and second cases 1 and 8 are somewhat open away from input device 3.

Figure 5:
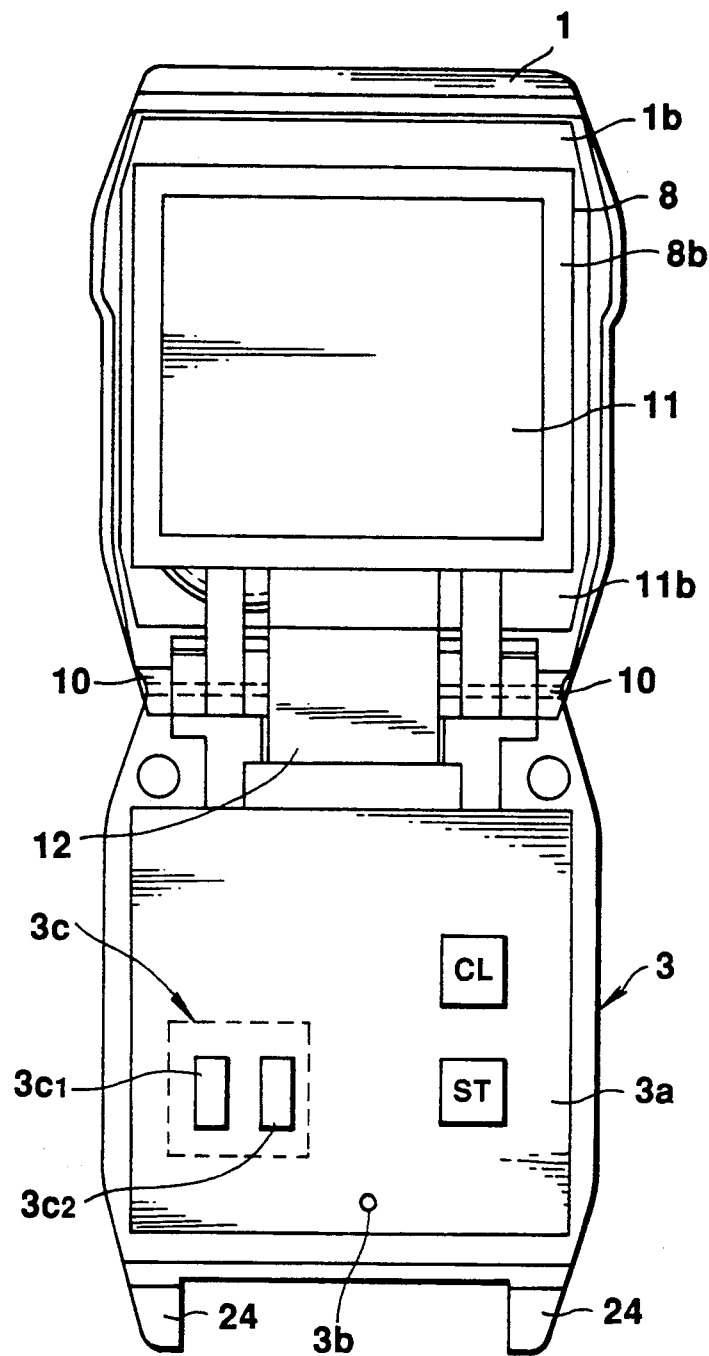
FIG. 5 is a plan view of the wristwatch in which the first and second cases are completely open.

FIG. 5 shows the state of the wristwatch in which second case 8 is further opened from the state of FIGS. 3 and 4 and superposed on the completely open first case 1. As will be seen in FIG. 5, second display 11 the overall surface of which is composed of a LCD (liquid crystal display device) of a dot matrix is provided on lower or back surface 8b of the second case is provided on lower surface 8b of the second case. Second display 11 is connected through flexible sheet 12 to the electronic circuit in input device 3 and displays data on the pulsation count measured by pulsation detector 3c.

Figure 6:
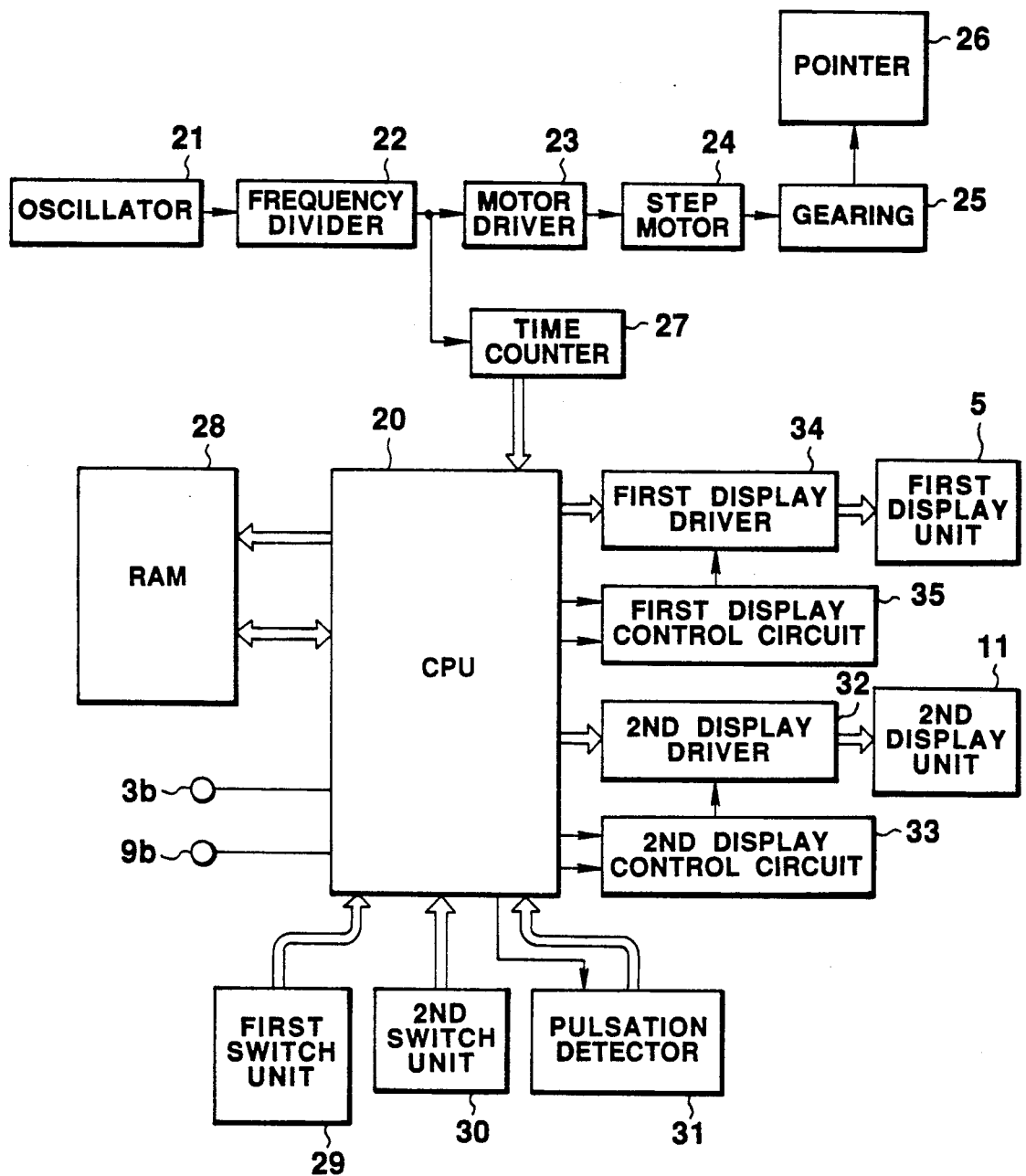
FIG. 6 is a block diagram of the wristwatch of FIG. 1.

FIG. 6 shows the circuit structure of the embodiment in which CPU 20 as the center has other circuits connected thereto. CPU 20 processes data from other circuits and delivers the results to them, and also delivers control signals to those circuits for controlling purposes. Oscillator 21 normally generates a signal of a predetermined frequency. A frequency divider 22 obtains a predetermined reduced frequency by division from the signal output of oscillator 21 and delivers it to motor driver 23 and time counter 27. Motor driver 23 drives step motor 24 in accordance with a signal from frequency divider 22. The rotation of step motor 24 is transmitted through a chain of gears 25 to pointer 26 for moving purposes. Time counter 27 counts signals of a predetermined frequency from frequency divider 22 to obtain the current time and delivers this data to CPU 20.

RAM 28 has a structure to be described later in more detail and stores data from CPU 20 under control of same. Photosensors 3b, 9b sense the opening of second and first cases 8 and 1 disposed on input device upper surface 3a and second case upper surface 8a, respectively, deliver a signal indicative of such detection to CPU 20. First switch unit 29 includes sheet switch unit 9 on second case upper surface 8a and delivers to CPU 20 a signal indicative of the operation of any one of the switches of sheet switch unit 9. Second switch unit 30 includes start switch ST and clear switch CL on input device upper surface 3a. When any one of those switches is operated, the second switch unit delivers a signal indicative of the operation to CPU 20. Pulsation detector 31 includes a pulsation sensor 3c on input device upper surface 3a, and gets data on the pulsation count on the basis of a signal from CPU 20 and delivers the data to same.

Second display driver 32 displays data from CPU 20 on second display unit 11 under control of second display control circuit 33 which operates in response to a signal from CPU 20. First display driver 34 causes data from CPU 20 to be displayed on first display unit 5 under control of first display control circuit 35 which operates in response to a signal from CPU 20.

Figure 7:
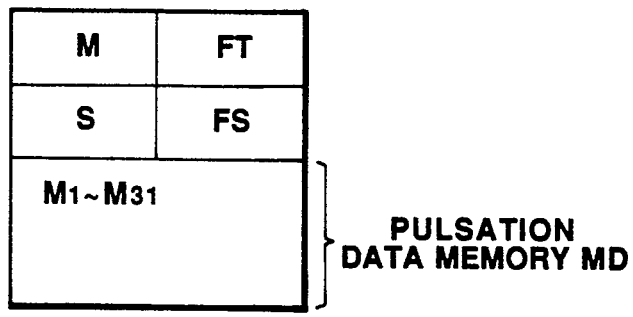
FIG. 7 illustrates the structure of a RAM of FIG. 6.

FIG. 7 shows the structure of RAM 28. Mode register M designates a mode. When 0 is set in the register, a clock mode is designated in which the current time is displayed on first display unit 5 while when 1 is set, a computer mode is designated in which the present embodiment is used as a computer. When 2 is set, a data bank mode is designated in which the stored data is sequentially displayed on first display 5. Opening register FT shows the open/closed state of first and second cases 1 and 8. When both first and second cases 1 and 8 are closed, 0 is set in FT while when first case is open, 1 is set. When second case 8 is open, 2 is set. Pulsation register S sets therein the pulsation count measured. Pulsation measurement state flag FS is set to 1 when a finger is placed on pulsation detector 3c. Pulsation data storage MD comprises memories $M_1$-$M_{31}$ which store the pulsations counts measured on days #1-#31 of each month.

Figure 9:
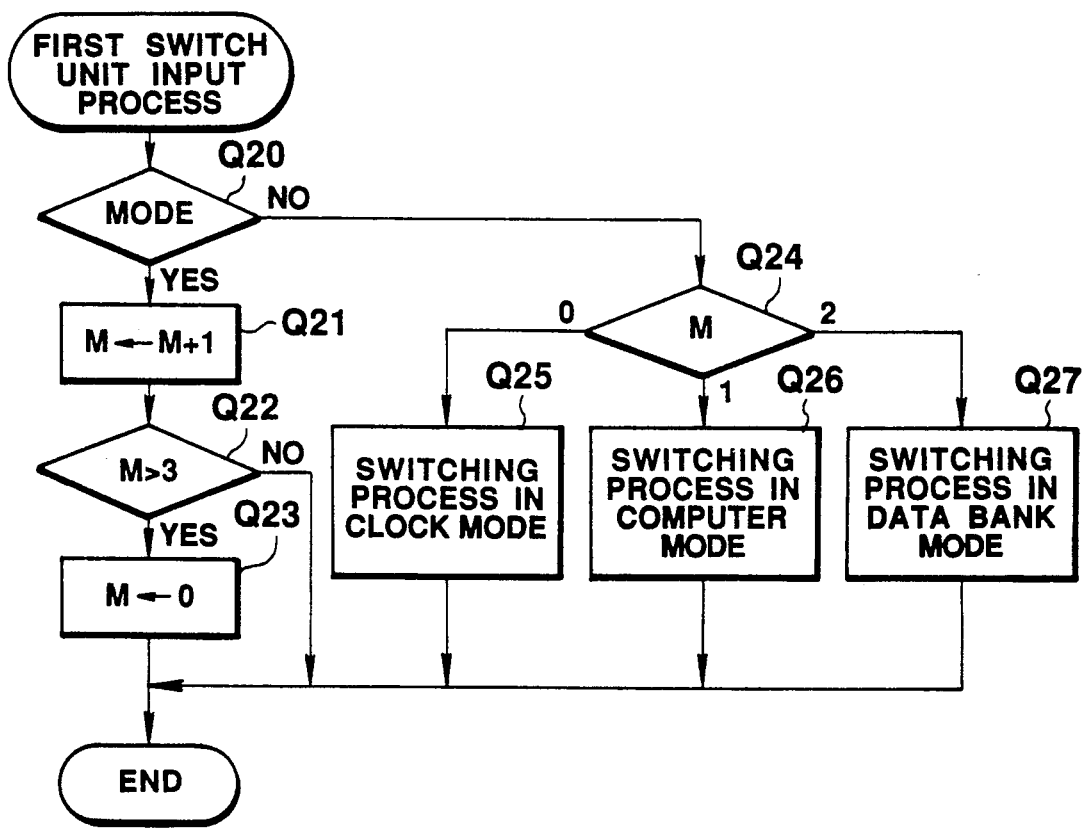
FIG. 9 is a flowchart indicative of the details of a first switch unit input processing operation of the FIG. 8 flowchart.
Figure 8:
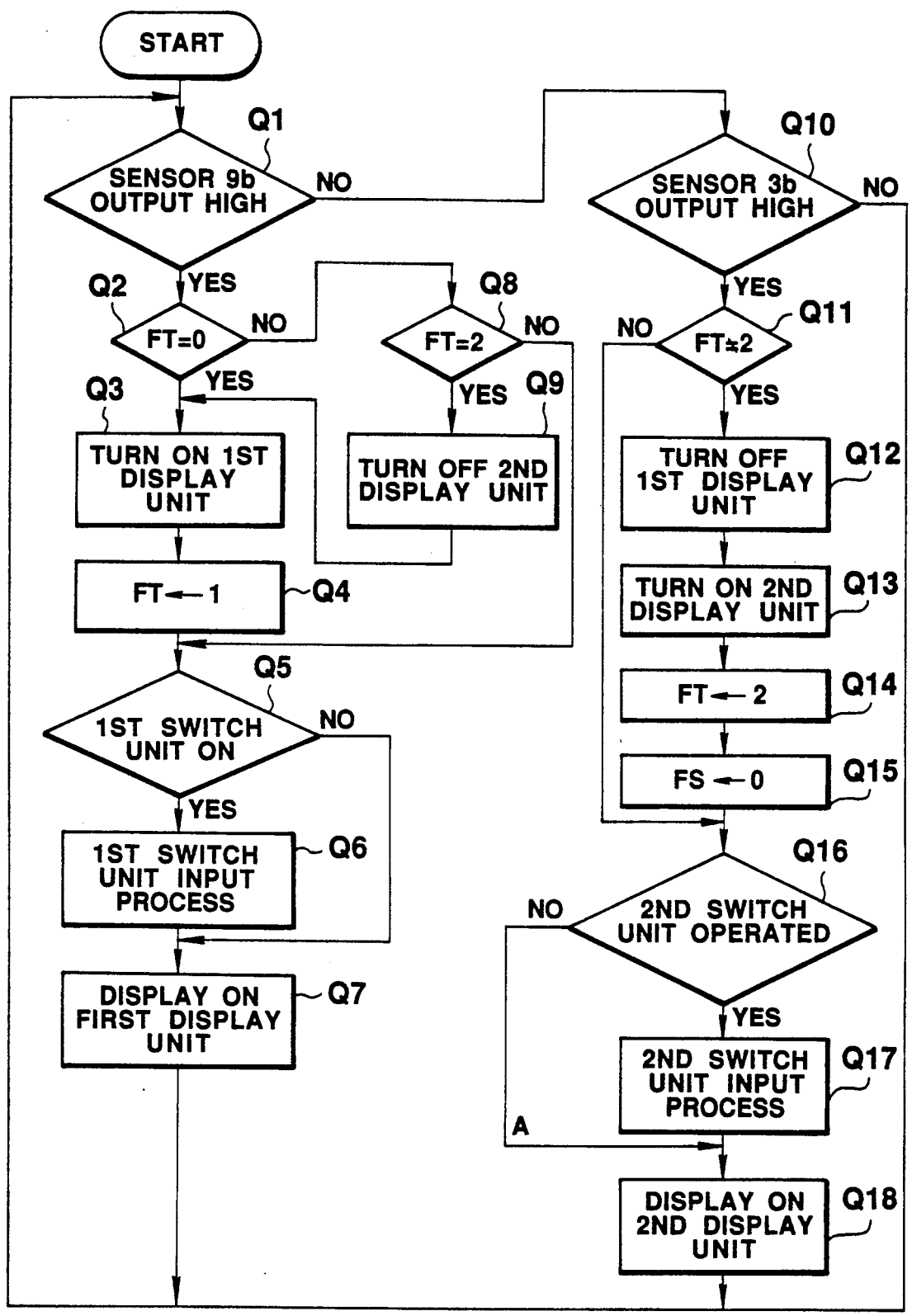
FIG. 8 is a general flowchart indicative of the operation of the FIG. 6 circuit.
Figure 10:
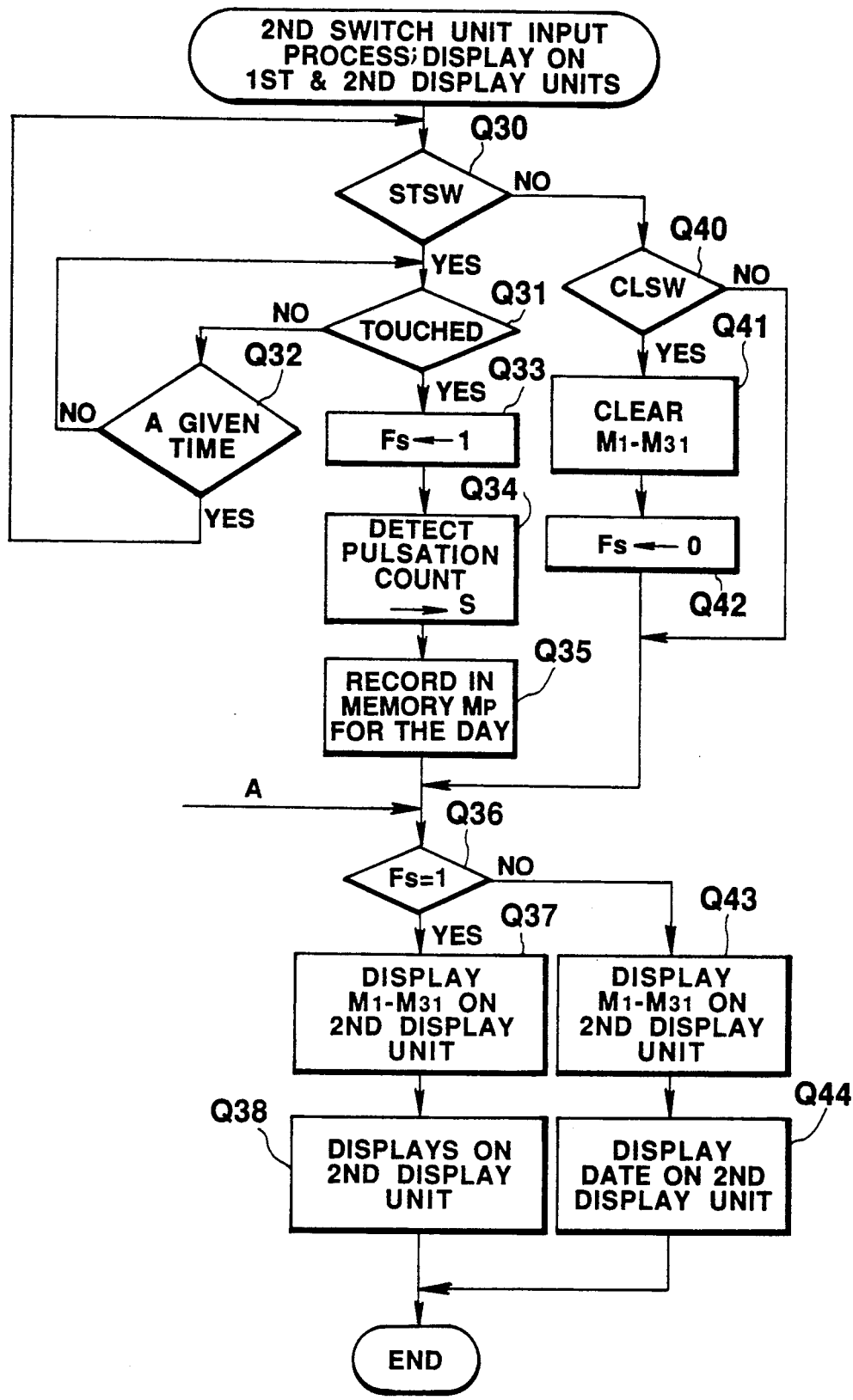
FIG. 10 is a flowchart indicative of the details of a second switch unit input processing operation of the FIG. 8 flowchart and first and second display unit displaying operations.

The operation of the embodiment thus constructed will be described below. FIG. 8 is a general flowchart which schematically describes the operation of the first embodiment. FIG. 9 is a flowchart showing the details of the input processing operation (step Q6) of the first switch unit 29 of FIG. 8. FIG. 10 is a flowchart indicative of the details of the input processing operation (step Q17) of the second switch unit 30 and the display element operation (step Q18) of the second display unit of FIG. 8. The respective operations of the wristwatch first and second cases 1 and 8 are opened will be described separately. When first case 1 is opened in the state in which first and second cases 1 and 8 are closed, at step Q1 it is ascertained that the output of photosensor 9b becomes high and control passes to step Q2 where it is ascertained that the value of opening register FT is still 0. Control passes to Q3 where first display unit 5 starts to be driven, and the value of opening register FT is then set to 1 at step Q4.

It is then checked at step Q5 whether any one of switches of sheet switch in first switch unit 29 is operated. If so, control passes to step Q6 comprising the input processing of the first switch unit 29 or to the flowchart of FIG. 9. If the operated switch is mode switch 9a, the value of the mode register is incremented by one to any one of 1, 2 and 3 at steps Q20-Q23 to change the mode designation. If the operated switch is other than the mode switch, processing conforming to the mode employed at that time is performed at steps Q24- Q27. After the input processing operation of the first switch unit at step Q6 is completed in this way, control passes to step Q7 where the result of the processing at step Q6 is displayed on first display 5. When no switch operation is performed at step Q5, control passes directly from step Q5 to step Q7 directed to the display operation. After those operations, control returns to step Q1 to check whether the output of photosensor 9b is still at high level. If so, the processing operations at steps Q5-Q7 are then performed after steps Q2 and Q8, and control then returns to step Q1.

The operation of the wristwatch performed when second case 8 is opened from input device 3 while keeping first case 1 closed against second case 8 will be described. In this case, at step Q1 it is ascertained that the output of photosensor 9b is not high and it is ascertained at step Q10 that the output of photosensor 3b is high. It is then ascertained at step Q11 that the value of opening register FT is not yet 2. At step Q12 the drive of first display unit 5 is stopped, and at step Q13 the drive of second display unit 11 starts. Then at step Q14 the numeral 2 is set in opening register FT to store the fact that the second case 8 is open. At step Q15 the numeral 0 is set in pulsation measurement state flag FS. At step Q16 it is checked whether there was an input from a switch of second switch unit 30. If so, control passes to the input processing operation of the second switch unit (step Q17) and the display by the second display unit (step Q18) or the flowchart of FIG. 10. More specifically, when start switch ST of second switch unit 30 is operated, this fact is detected at step Q30. Standby continues for a predetermined time until a finger touches pulsation detector 3c at steps Q31, Q32. When touching pulsation detector 3c by a finger is detected at step Q31, control passes to Q33 where 1 is set in pulsation measurement state flag FS. At step Q34 detection of the pulsation count is performed, the pulsation count detected is set in pulsation count register S. Then, control passes to Q35 when the pulsation count set in pulsation count register S is recorded in the one, used for the day of detection, of memories $M_1$-$M_{31}$ of pulsation data storage MD. Control then passes to step Q36 where it is ascertained that pulsation measurement state flag FS is set to 1. At step 37 the daily pulsation counts for the month recorded in the memories $M_1$-$M_{31}$ are displayed on second display unit 11. At step 38 the pulsation count measured this time and set in pulsation count register S is also displayed on second display unit 11. After the above processing, control returns to step Q1 of FIG. 8. Control then passes to steps Q10, Q11, Q16-Q18 and returns to step Q1, and these operations are iterated. When it is determined at Q16 that no switches of second switch unit 30 are operated, the input processing of the second switch unit at step Q17 is not performed and control directly passes to the second display processing at step Q18 (that is, control passes along the arrow A of FIG. 10 which shows the details of both steps Q17 and Q18 and then passes to step Q36).

At step Q16 of FIG. 8 the operation of any switch of second switch unit 30 is detected, and control then passes to the flowchart of FIG. 10, as mentioned above. When it is detected at step Q40 that the operated switch is clear switch CL, control passes to step Q41 where pulsation data in memories $M_1$-$M_{31}$ of pulsation data storage MD is erased. At step Q42 pulsation measurement state flag FS is set to 0. At step Q36 it is detected that flag FS is not 1. Control passes to Q43 where the data stored in memories $M_1$-$M_{31}$ is displayed, and at step Q44 the date of that day is displayed. After the display processing (steps Q43, Q44 or step Q18 of FIG. 8) at second display unit 11 is completed, control returns to step Q1 of FIG. 8 and thereafter operations similar to those mentioned above are iterated.

When second case 8 is closed in a state in which first and second cases 1 and 8 are open it is ascertained that the output of photosensor 9b becomes high at step Q1. Control then passes through step Q2 to step Q8 where it is ascertained that the value of opening register FT is 2. Control then passes to step Q9 where the drive of second display 11 is stopped. At step Q3 the drive of first display 5 starts. Then at step Q4 the value of opening register FT is set to 1. The processing at steps Q5–Q7 is performed and then control returns to step Q1.

As mentioned above, since in the first embodiment first and second cases 1 and 8 are attached openably by pin 10 to one end of input device 3 such that first and second cases 1 and 8 can be opened/closed in the same direction, the structure which attaches first case 1, etc., to input device 3 is simple and is easy to manufacture, advantageously. In the present embodiment, mode switch 9a and photosensor 3b are attached to second case upper surface 8a and input device upper surface 3a, respectively, so as to detect the opening of first and second cases 1 and 8 and only a display which may be opened and used is driven. Therefore, no useless power consumption is avoided, advantageously. In the present embodiment, a space for provision of switches is secured not only on input device upper surface 3a, but also on second case upper embodiment is capable of coping with an increase in the number of switches due to multi-functionization.

(2) Second Embodiment

A second embodiment of the present invention applied to a multi-function electronic wristwatch will be described with reference to FIGS. 11–14. FIG. 11 shows the appearance of the present embodiment.

Figure 11A:
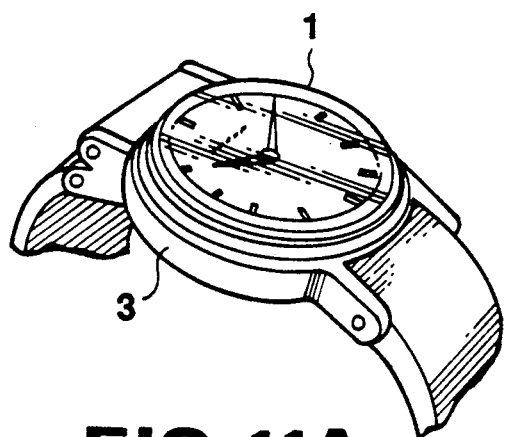
FIG. 11A is a perspective view of a second embodiment of the electronic wristwatch according to the present invention in which the first case is closed.
Figure 11B:
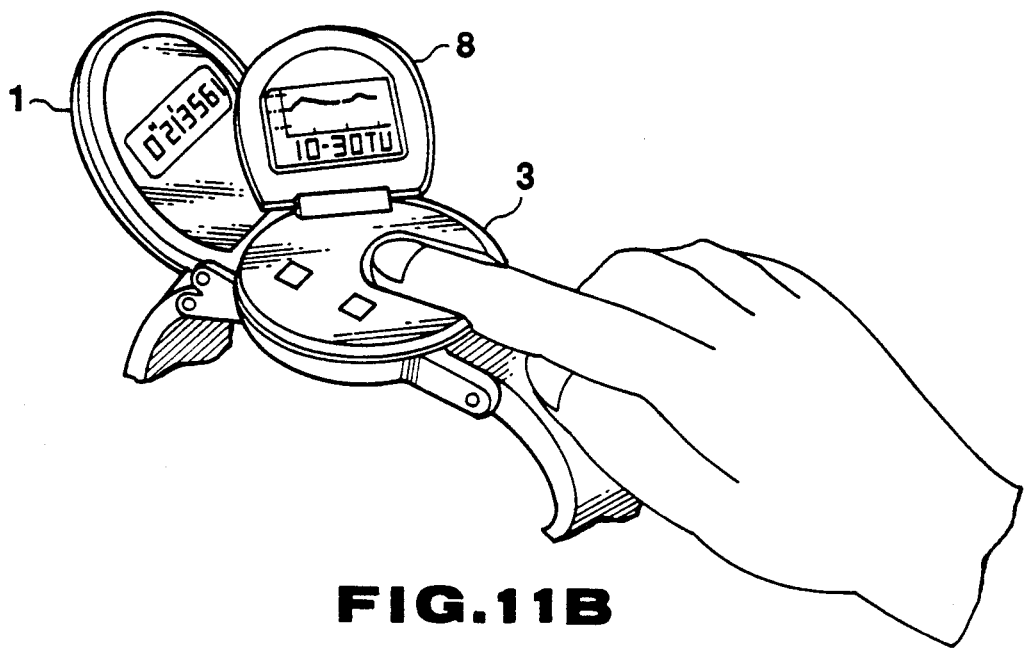
FIG. 11B is a perspective view of the wristwatch of FIG. 11A in which the first and second cases are open.

FIG. 11A shows the wristwatch in which first and second cases 1 and 8 are closed against input device 3. As will be seen in FIG. 11A, a pointer display which displays the current time is provided on an upper surface of first case 1. FIG. 11B shows the wristwatch in which first and second cases 1 and 8 are opened from input device 3. The present embodiment differs from the first embodiment in that first and second cases 1 and 8 of the present embodiment are attached openably at different positions on input device 3 opened/closed in different directions. Second case 8 is adapted to maintain the rising angle from input device 3 while rotating such that the angle between the open first and second cases is adjusted to cause the LCDs on the lower surfaces of first and second cases 1 and 8 to be put simultaneously in an easy-to-view state. The angle of view in the LCD is small, so that if the LCD of one of the first and second cases is put in an easy-to-see angle when the first and second cases are opened in different directions, the LCD of the other case would become difficult to see. In order to avoid such situation, a mechanism is provided in which one case is rotatable horizontally such that the two LCDs are put simultaneously in an easy-to-view state.

Figure 11C:
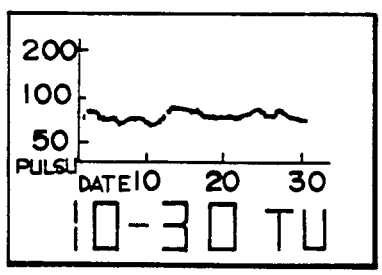
FIG. 11C shows an illustrative display of the FIG. 11A wristwatch.

The present embodiment has approximately the same structure as the first embodiment except for the above points. FIG. 11C shows illustrative data on pulsations displayed on the second display provided on the lower surface of second case 8 when the present embodiment is used as a pulsimeter.

Figure 12:
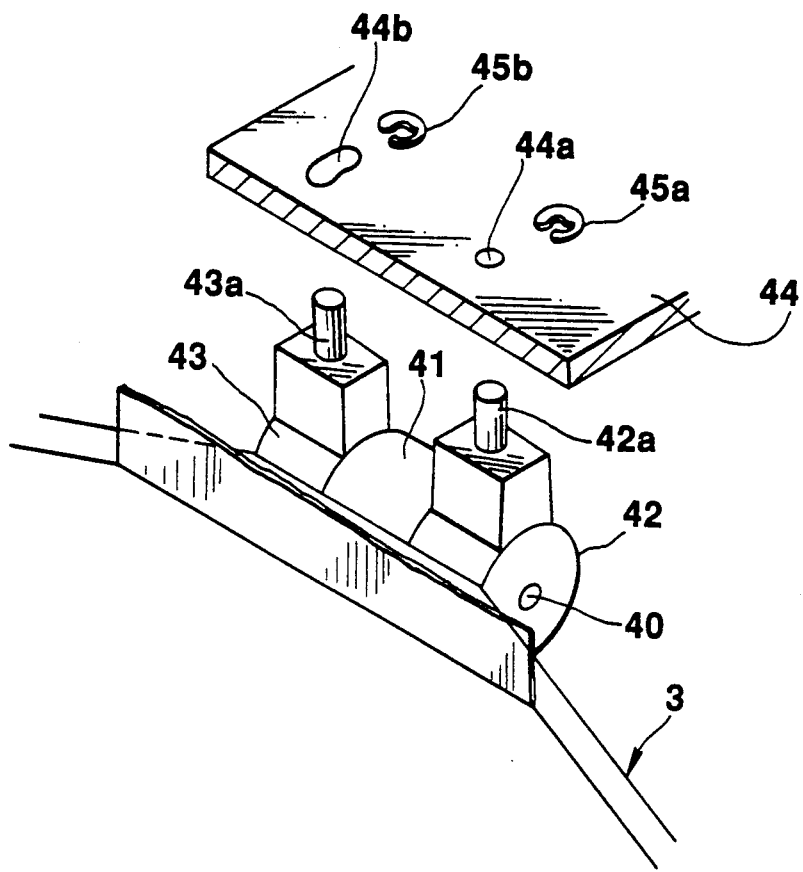
FIG. 12 is a perspective view of a second case attaching mechanism of the FIG. 11A wristwatch.

FIG. 12 shows a mechanism for attachment to input device 3 of second case 8. Pins 42a, 43a are provided in connection members 42, 43, respectively, attached pivotally by pin 40 which is held by pin holder 41 provided at one end of input device 3. Pin 42a fits rotatably in circular hole 44a in attaching member 44 provided below second case 8 while pin 43a fits loosely in slot 44b. Slot 44b extends along the periphery of a circle the center of which coincides with that of hole 44a. Upper end portions of pins 42a, 43a extending through hole 44a and slot 44b have thereon grooves extending along the peripheries of those pins into which groves E-like rings 45a and 45b are fitted such that pins 42a, 43a do not slip off hole 44a and slot 44b. In such attaching mechanism, second case 8 is turnable through a predetermined angle prescribed by the length of slot 44b with pin 42a as the center. The direction of the LCD provided on the lower surface of second case 8 is changed due to the turn of the second case 8 so as to be easily viewed even if the LCD on the lower surface of first case 1 is viewed in an easy-to-view direction.

The circuit configuration of the present embodiment is approximately the same as the first embodiment and is shown by FIG. 6. The structure of RAM 28 of FIG. 6 is also approximately the same as the first embodiment and is shown in FIG. 7.

Figure 13:
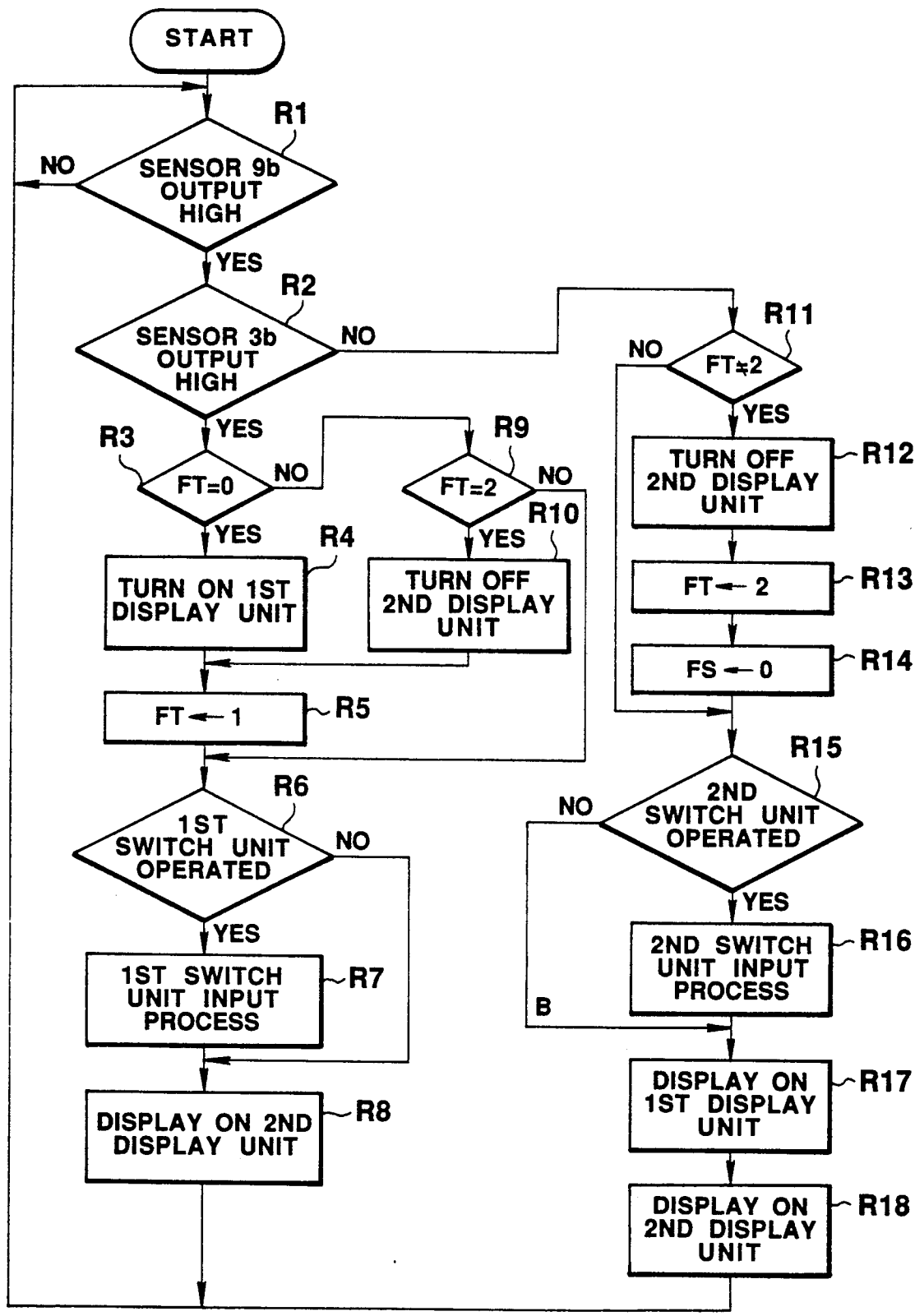
FIG. 13 is a general flowchart indicative of the operation of the circuit of the wristwatch of FIGS. 11A and 11B.
Figure 14:
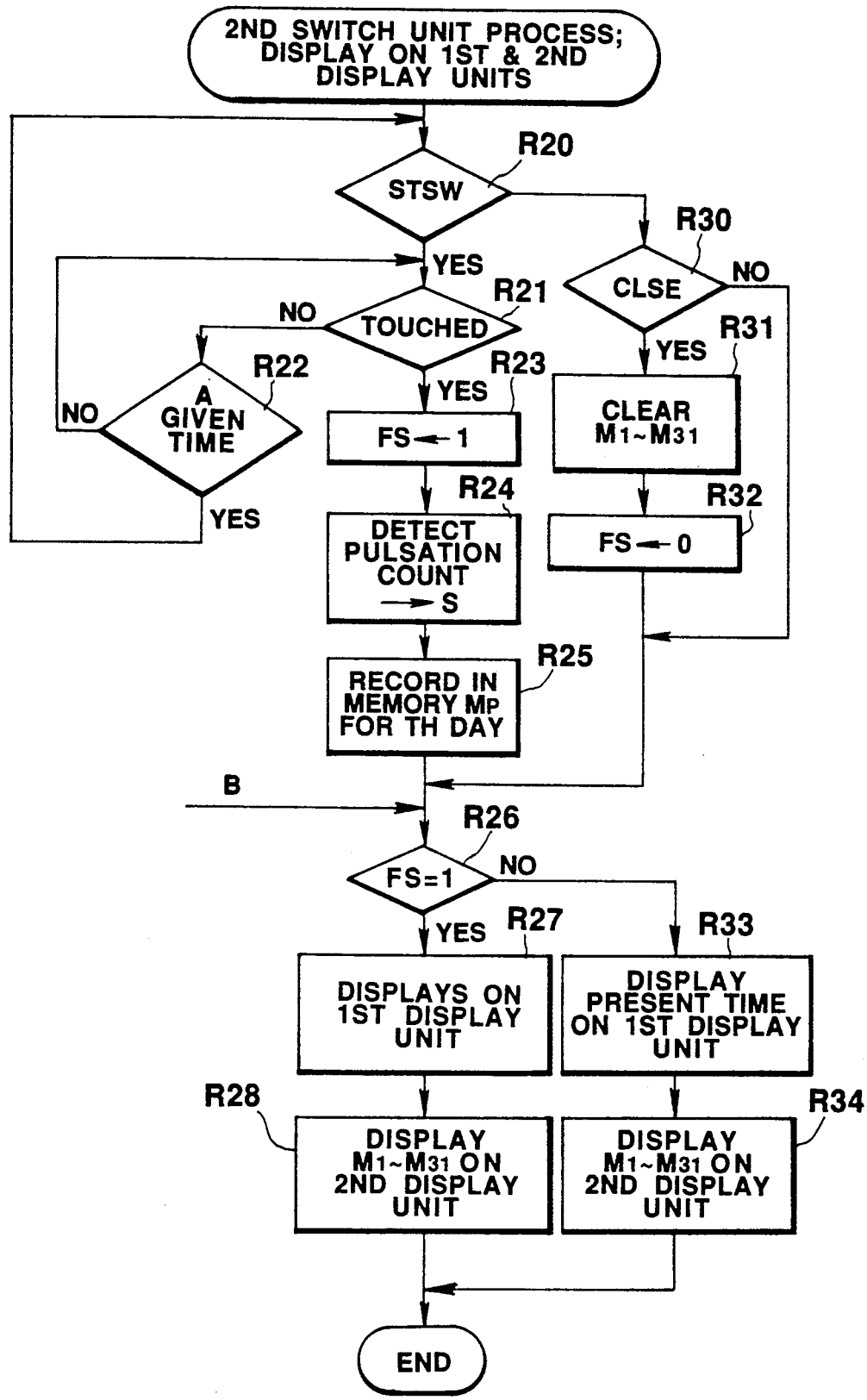
FIG. 14 is a flowchart indicative of the details of the second switch unit inputting operation and the first and second display unit displaying operations of the flow of FIG. 13.

The operation of the present embodiment thus constructed will be described next. FIG. 13 is a general flowchart outlining the operation of the present embodiment. FIG. 14 is a flowchart showing the details of the input processing operation of the second switch unit, and the display processing operation (steps R16–R18) of the first and second display units of FIG. 13. The general flowchart of FIG. 13 is extremely similar to that of the first embodiment. However, the first and second cases 1 and 8 are attached at different positions of input device 3, so that when second case 8 is opened, first case 1 is beforehand opened necessarily. To this end, only when the output of photosensor 9b is at high level, it is checked whether the output of photosensor 3b is at high level or low level (steps R1, R2). Therefore, when only first case 1 is opened from a state in which both the first and second cases 1 and 8 are closed, processing at steps R1, R2 and then at R3–R8 is performed. Then control returns to step R1 and then iterates similar processing. When only second case 8 is closed from a state in which first and second cases 1 and 8 are open, processing at steps R1, R2 and then at R3, R9 is performed similarly. Control then passes to step R10 where the drive of second display 11 is stopped. Thereafter, control passes to steps R5–R8 and returns then to step R1. Thereafter, similar operations are iterated (steps R1–R8).

When second case 8 is opened in a state in which first case 1 is open, it is ascertained that both the outputs of photosensors 9b, 3b are at high level (steps R1, R2). Control then passes to step R11 where it is ascertained whether the value of opening register FT is 2. At step R12 second display unit 11 starts to be driven. At step R13 the numeral 2 is set in opening register FT. At step R14 the numeral 0 is set in pulsation measurement state flag FS. It is then determined at step R15 whether any switch of second switch unit 30 is operated. If so, control passes to the input processing of the second switch unit at step R16, or steps R20–R25, R30–R32 of FIG. 14. If it is determined at step R15 that no switches are operated, and the input processing of the second switch unit at step R16 is completed, control passes to the first and second display processing (steps R17, R18), that is, to steps R26–R28, R33, R34 of FIG. 14.

The flowchart of FIG. 14 is approximately the same as that of FIG. 10 directed to the first embodiment except for the following respects: In the embodiment, the first case 1 is necessarily open when the second case 8 is open and second display unit 11 is available, and first display unit 5 is also available as mentioned above. Therefore, in order to use the first display unit 5, the pulsation count measured is displayed on first display unit 5 after measured (step R27), and the pulsation count and the date of the day of measurement stored in memories $M_1$–$M_{31}$ are displayed on second display unit 11, as shown in FIG. 11C (step R28). In other cases, the current time is displayed on first display unit 5 (step R33), the pulsation count and the date of the day stored in memories $M_1$-$M_{31}$ are displayed on second display unit 11 (step R34).

As described above, according to the present embodiment, since first and second cases 1 and 8 are attached openably at different positions on input device 3 so as to be opened/closed in different directions, complication of the attaching mechanism is avoided advantageously. Since the present embodiment includes on second case 8 the angle adjusting mechanism which adjusts the angle of second case 8 relative to first case 1 in an open/closed state of the first and second cases, first and second display units 5 and 11 provided on first case upper surface 1b and second case lower surface 8b, respectively, can clearly be seen simultaneously. In addition, photosensors 9b and 3b are provided on second case upper surface 8a and input device upper surface 3a, respectively, so that an unused display is detected from the outputs of those photosensors to thereby stop the drive of that photosensor to thereby save the power consumption of the power source battery. Since many switches are provided not only on input device upper surface 3a but also on second case upper surface 8a to thereby cope with an increase in the number of switches due to multifunctionization to thereby avoid the trouble of combining and operating a few switches in order to provide multifunctional control.

While in the present embodiment two first and second cases 1 and 8 are provided at different positions on the input device 3, the number of cases attached to input device 3 is not limited to 2 and three or more cases may be provided at different positions so as to be opened in different directions, of course.

(3) Third Embodiment

A multifunctionized electronic wristwatch as third embodiment of the present invention will be described with reference to FIGS. 15-18. Like elements of the third and first embodiments are identified by the same reference numeral and further description thereof will be omitted.

The third embodiment differs from the first embodiment in that a mode is selected in accordance with the opening angle of first case 1 and the data on the mode is displayed on first display unit 5.

FIG. 15 shows the appearance of the wristwatch. FIG. 15A shows the wristwatch in which first and second cases 1 and 8 are attached openably to input device 3 and closed against same. FIG. 15B shows the wristwatch with open first case 1. First display 5 is provided on a lower surface of first case 1 and first switch unit 29 is provided on an upper surface of second case 8. FIG. 15C shows the wristwatch in which first case 1 was opened and then second case 8 was half opened.

Figure 16A:
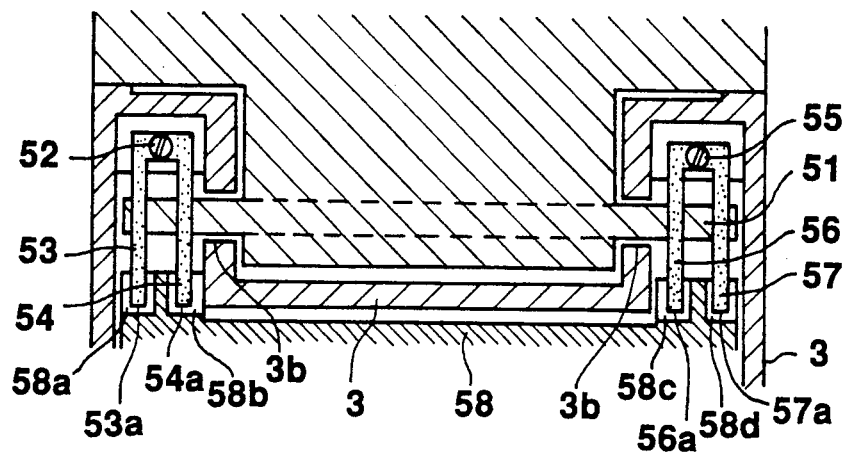
FIG. 16A is a plan view of a first case opening angle detector of the wristwatch of FIGS. 15A-15C.
Figure 16B:
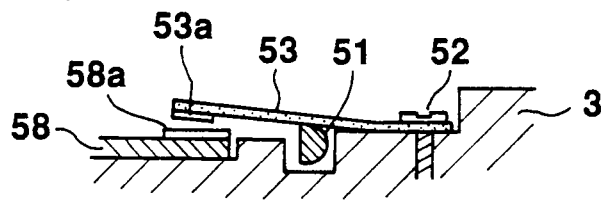
FIG. 16B is a side view of the first case opening angle detector of FIG. 16A.
Figure 16C:
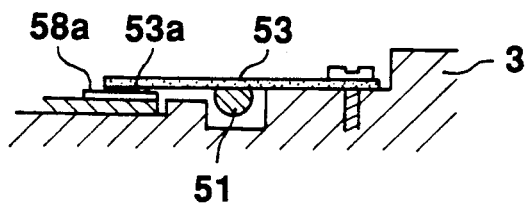
FIG. 16C is a side view of the FIG. 16A wristwatch in which the first case of the first case opening angle detector is open at a predetermined angle.

FIG. 16 shows an open angle detection mechanism provided in an attaching unit which attaches first case 1 openably to input device 3. As shown in FIG. 16A, shaft 51 fixed to first case 1 is supported pivotally on bearing 3b of input device 3. Leaf springs 53, 54 integral with each other and leaf springs 56, 57 also integral with each other are fixed to input device 3 by set screws 52, 55, respectively so as to bias shaft 51. Contacts 53a, 54a, 56a, 57a provided at ends of leaf springs 53, 54, 56, 57 oppose contact pads 58a, 58b, 58c, 58d, respectively, on circuit board 58 of input device 3. Shaft 51 has substantially the form of a cylindrical rod with flat cam surfaces disposed at different positions along the periphery of shaft 51 and contacting with leaf springs 53, 54, 56, 57 (see FIG. 16B). When first case 1 is closed as shown in FIG. 16B, leaf springs 53, 54, 56, 57 are pushed upward by a curved surface of shaft 56 (other than the flat cam surfaces). Therefore, all contacts 53a, 54a, 56a, 57a on the springs 53, 54, 56, 57 do not contact with contact pads 58a-58d on circuit board 58. When first case 1 is opened from this situation so as to take an angle of 90 degrees to input device 3, shaft 50 is also rotated through 90 degrees, so that leaf spring 53 pushes the corresponding flat cam surface of shaft 50. This releases the pushing up of leaf spring 53, so that contact 53a contacts with contact pad 58a. As mentioned above, the respective flat surfaces of shaft 50 are provided at different positions along the periphery of shaft 50, so that leaf springs 53, 54, 56, 57 sequentially take the state of FIG. 16C in accordance with an opening angle of the upper case 1 determined between 90 degrees and 150 degrees which is the upper opening angle limit and the contacts thereof contact sequentially with the corresponding contact pads.

Figure 17:
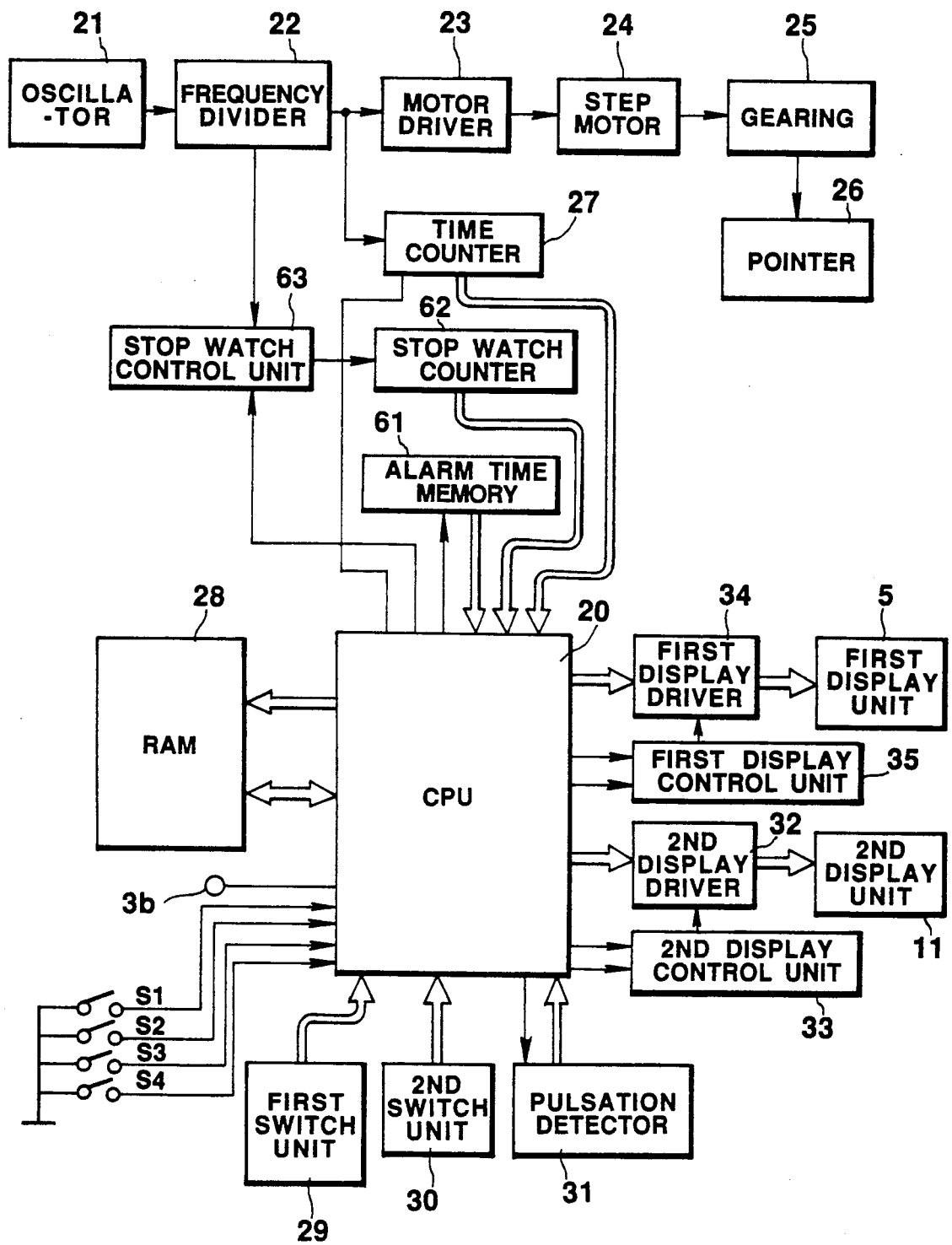
FIG. 17 is a block diagram indicative of the circuit configuration of the wristwatch of FIGS. 15A-15C.

FIG. 17 is a block diagram indicative of the circuit configuration of a third embodiment. The third embodiment differs from the first embodiment in that the former has a stop watch function and an alarm function, and hence alarm time memory 61, stop watch counter 62 and stop watch control unit 63. Alarm time memory 61 stores an alarm time in accordance with a signal from CPU 20, and outputs the stored alarm time to CPU 20. Stop watch control unit 63 intermittently delivers a signal from frequency divider 22 to stop watch counter 62 on the basis of a signal from CPU 20. Stop watch counter 62 counts signals delivered through stop watch control unit 63 from frequency divider 22 to obtain data on the time passed so far and delivers same to CPU 20.

CPU 20 receives output signals from switches S1-S4 which are respectively composed of leaf spring contacts 53a, 54a, 56a, 57a and contact pads 58a, 58b, 58c, 58d on the circuit board.

Figure 18:
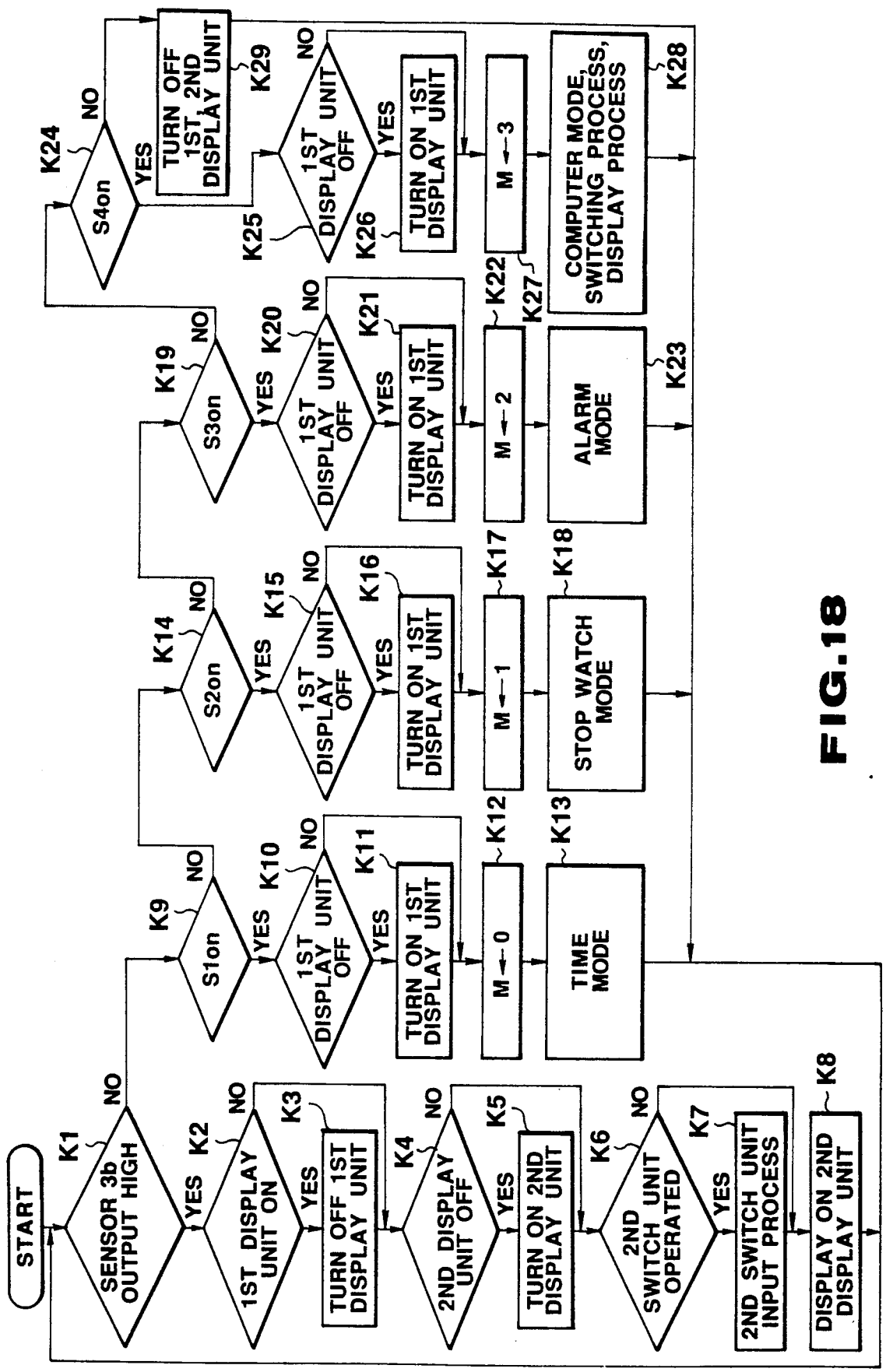
FIG. 18 is a flowchart indicative of the operation of the FIG. 17 circuit.

FIG. 18 is a flowchart indicative of the operation of the FIG. 17 circuit, and the operation of the third embodiment will be described with reference to this flowchart.

For example, when first and second cases 1 and 8 area closed against input device 3 and any one of switches S1-S4 is off and the output of photosensor 3b is at low level, control passes to step K29 where display drivers 34, 32 stops driving first and second display units 5, 11 in accordance with a signal from CPU 20 to thereby prevent useless power consumption of the power source battery. When only first case 1 is opened, so that its opening angle becomes 90 degrees to the input device and switch S1 is switched on, this situation is detected at step K9 and control passes to step K10 where it is determined whether first display unit 5 is driven. If not, control passes to step K11 where display unit 5 starts to be driven. At step K12 the numeral 0 is set in mode register M of RAM 32 to designate a clock mode. Control then passes to K13 where the time mode operation is performed or the current time of time counter 27 is displayed on first display unit 5. This operation is iterated until second case 8 is opened and the output of photosensor 3b becomes high or the opening angle of first case 1 changes and switch S1 is switched off.

When switch S2 is switched on after first case 1 is further opened and switch S1 is switched off, this situation is detected at step K14 where when first display 5 is not driven, same is driven. Then, 1 is set in mode register M to provide a stop watch mode to thereby perform the corresponding operation (steps K15-K18).

When switch S3 is switched on after first case 1 is further opened from the last state and switch S2 is switched off, this situation is detected at step K19 and 2 is set in mode register M to provide an alarm mode and hence perform the corresponding operation. For example, an alarm time of alarm time memory 61 is displayed on first display 5 (steps K20-K23).

When first case 1 is opened to a maximum of 150 degrees only switch S4 is switched on. This situation is detected at step K24, and 3 is then set in mode register M to provide a computer mode to thereby perform switching processes in that mode (steps K25- K28).

Since the output of photosensor 3b becomes high when second case 8 is opened, this situation is detected at step K1 and control passes to step K2 where it is determined whether first display 5 is driven. If so, control passes to K3 where the drive of first display 5 is stopped. Control then passes to step K4 where it is determined whether second display 11 is driven. If not, control passes to step K5 where second display 11 is driven. Control then passes to step K6 where it is determined whether any switch of second switch unit 30 is operated. If so, control passes to step K7 where a required input process of second switch unit 30 is performed. Control then passes to step K8 where the display processing of second display 11 is performed.

As described above, data to be displayed is designated in accordance with the opening angle of the first case in the third embodiment, so that the need for a troublesome keying operation to designate data to be displayed is eliminated.

(4) Fourth Embodiment

A fourth embodiment of the present invention will be described with reference to FIGS. 19A-22. Like elements of the first and fourth embodiments are identified by the same reference numerals and further description thereof will be omitted.

The fourth embodiment differs from the third embodiment in that in the fourth embodiment first case 1 is openable in different directions, a mode is selected in accordance with the direction of opening the first case and the data on the mode is displayed on the first display unit 5 and that the direction of opening of the second case 8 is different from that of opening first case 1 as in the second embodiment such that first and second display units 5 and 11 of the first and second cases are visible together.

Figure 19A:
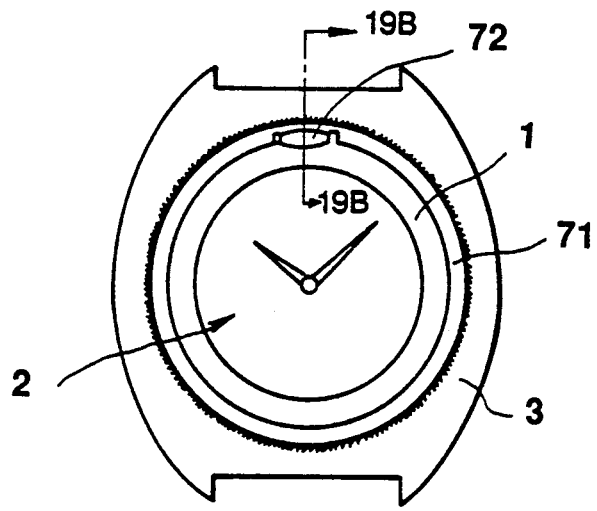
FIG. 19A is a plan view of an electronic wristwatch as a fourth embodiment of the present invention in which the first and second cases are closed.
Figure 19B:
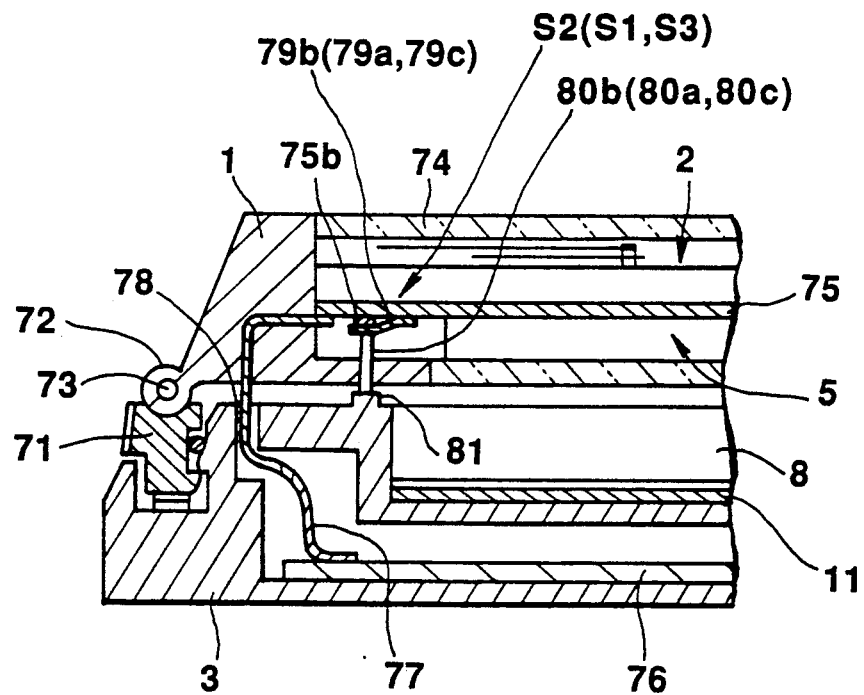
FIG. 19B is a cross-sectional view taken along the line 19B—19B of the FIG. 19A wristwatch.

FIG. 19A shows the appearance of the fourth embodiment. Upper case 1 with a pointer display 2 thereon is not directly attached to input device 3; that is, it is openably attached through hinge 72 to a register ring 71 provided turnable through a predetermined angle on an upper surface of input device 3. Second case 8 is attached so as to be opened in the direction of 3 o'clock. FIG. 19B is a cross-sectional view taken along the line 19B—19B of FIG. 19A. Hinge 72 is provided on register ring 71 attached rotatably to input device 3 to attach first case 1 to register ring 71 openably by pin 73. Pointer display 2 covered with watch glass 74 is disposed on an upper surface of first case 1 while circuit board 75 for an electronic circuit in first case 1 is provided below pointer display 2. First display unit 5 is provided below circuit board 75 or on the lower surface of first case 1.

Switches of second input unit 11 are disposed on the upper surface of input device 3. Flexible lead 77 which electrically connects circuit board 76 of input device 3 and circuit board 75 of first case 1 is introduced through an opening 78 in the upper surface of input device 3 into first case 1 and connected to circuit board 75.

Three movable contact springs 79a, 79b, 79c are attached on the lower surface of circuit board 75 of first case 1 while contact pads 75a, 75b, 75c are formed on circuit board 75 in correspondence to springs 79a, 79b, 79c, respectively. Operating elements 80a, 80b, 80c are provided in a hole formed in the lower surface of first case 1 in correspondence to springs 79a, 79b, 79c, respectively. When first case 1 is closed, any one of operating elements 80a, 80b, 80c is pushed up by protrusion 81 provided on an upper surface of input device 3 such that the contact for movable contact spring 79 contacts the corresponding contact pad on circuit board 75.

Figure 20:
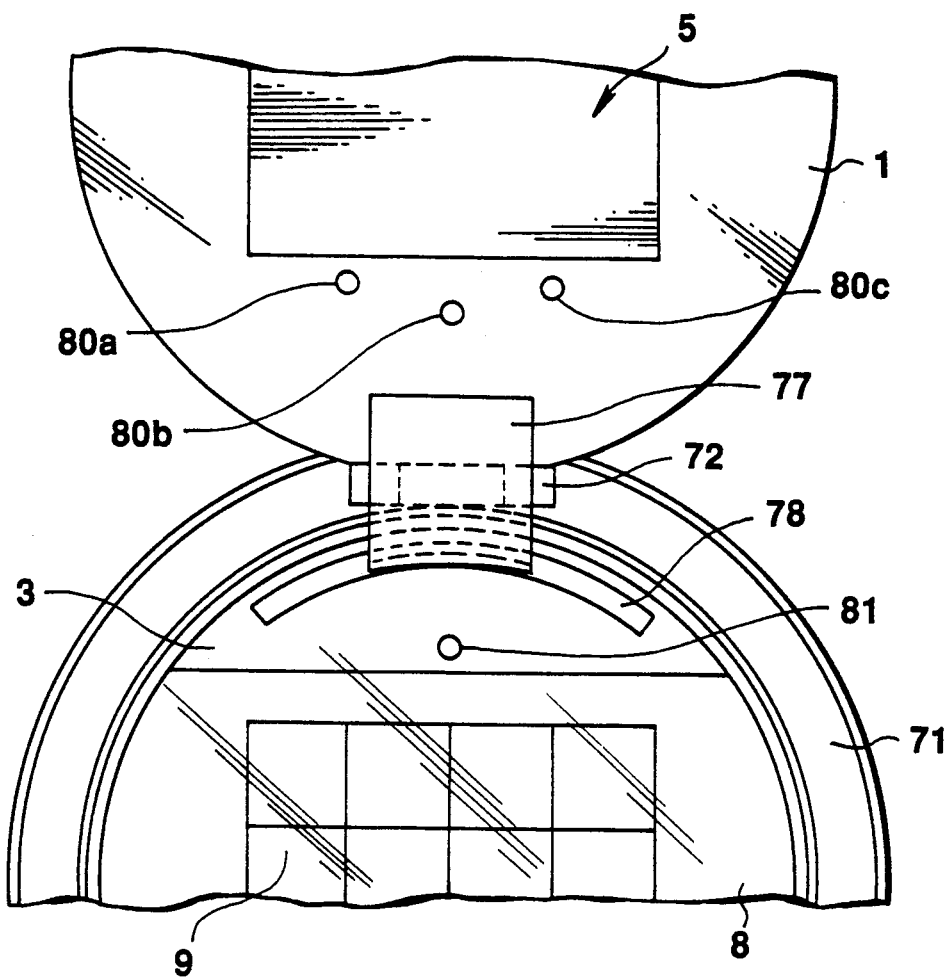
FIG. 20 shows a part of the wristwatch of FIGS. 19A and 19B in which the first case is open.

FIG. 20 also shows an attaching member of first case 1 in a state in which only first case 1 is open above input device 3. The cutout 78 is arcuate. When register ring 71 and first case 1 attached through hinge 72 to the register ring are rotated, flexible lead 77 fixed on the first case 1 side slides through cutout 78. Operating elements 80a, 80c similar to operating element 80b are provided on the lower surface of first case 1. When first case 1 is closed, each of operating elements 80a-80c is pushed up by protrusion 81 due to the rotation of register ring 71 or upper case 1.

Figure 21:
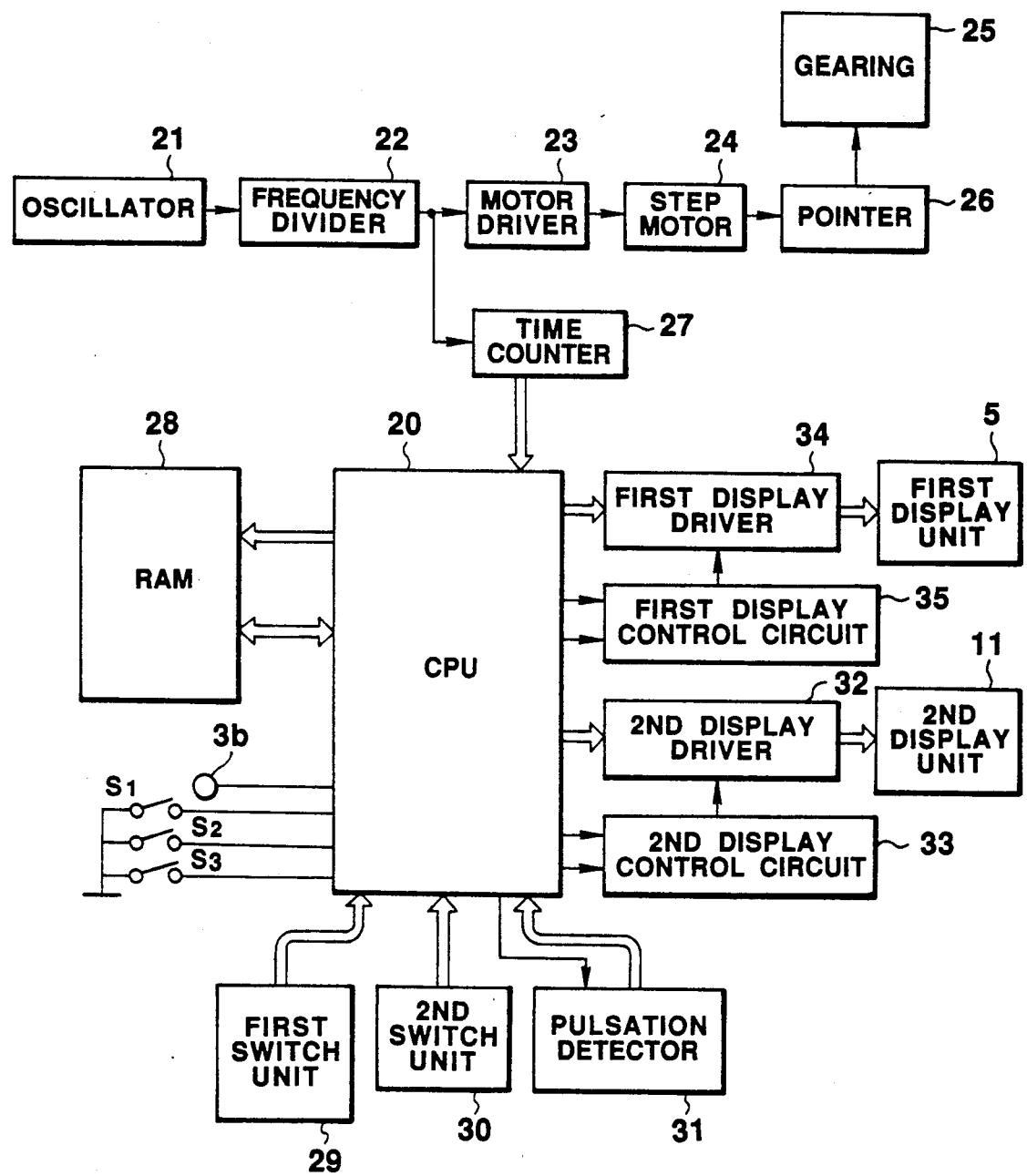
FIG. 21 is a block diagram indicative of the circuit configuration of the wristwatch of FIGS. 19A and 19B.

FIG. 21 is a block diagram indicative of the circuit configuration of the fourth embodiment. This embodiment differs from the first embodiment in that in the former embodiment CPU receives output signals from switches S1, S2, S3 which respectively composed of movable contact spring 79a, 79b, 79c provided in correspondence to operating elements 80a, 80b, 80c and contact pads 75a, 75b, 75c on circuit board 75.

Figure 22:
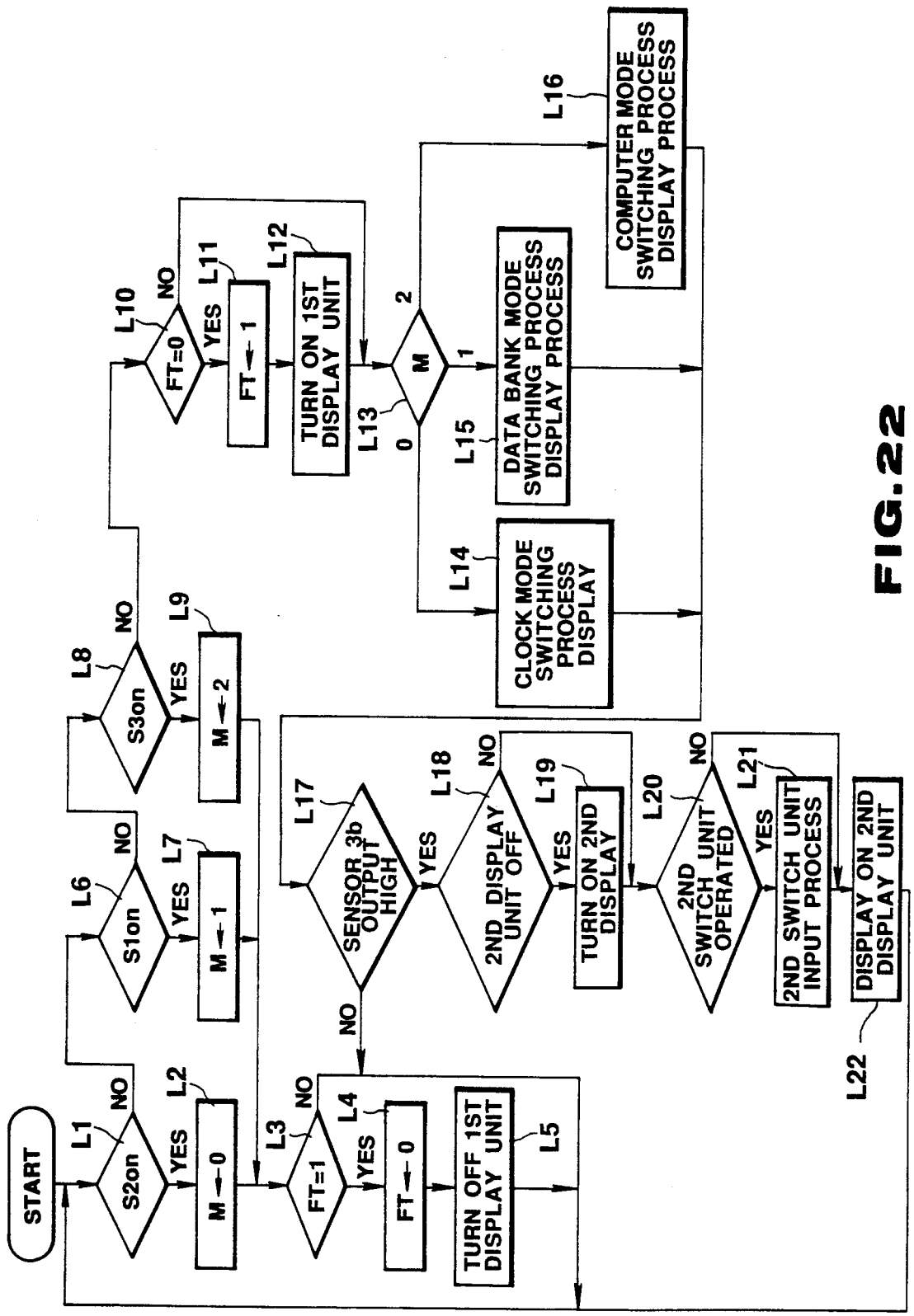
FIG. 22 is a flowchart indicative of the operation of the FIG. 21 circuit.

FIG. 22 is a flowchart indicative of the operation of the circuit of FIG. 17 with reference to which the fourth embodiment will be described below.

For example, if first and second cases 1 and 8 are closed against input unit 3 and first case 1 is at the center of the range of rotation, the ON state of switch S2 (due to the fact that protrusion 81 pushes up operating element 80b such that movable contact spring 79b is in contact with contact pad 75b) is detected at L1. Control then passes to L2 where 0 is set in register M to thereby provide a clock mode. Control then passes to L3 where it is determined whether flag FT is 1. Since flag FT is set to 1 when first case 1 is open and first display unit 5 is driven, it is determined at step L3 whether the situation is directly after first case 1 is closed. If it is determined so at step L3, control passes to step L4 where 0 is set in register FT. Control then passes to step L5 where the drive of first display unit 5 is stopped.

If the first and second cases have been closed against input device 3 and first case 1 has been rotated clockwise, the ON state of switch S1 (due to the fact that protrusion 81 has pushed up operating unit 80a and hence movable contact spring 79a is in contact with contact pad 75a) is detected at step L6. Control then passes to step L7 where 1 is set in mode register M to provide a data bank mode. Control then passes to step L3 where it is determined whether flag FT is 1. If so, control passes to step L4 where 0 is set in register FT. Control then passes to L5 where the drive of first display 5 is stopped.

When first and second cases have been closed against input device 3 and first case 1 has been rotated counterclockwise, the ON state of switch S3 (due to the fact that protrusion 80c has pushed up operating element 80c, so that movable contact spring 59c is in contact with contact pad 75c) is detected at step L8. Control then passes to L9 where 2 is set in mode register M to provide a computer mode. Control then passes to step L3 where it is determined whether flag FT is 1. If so, control passes to step L4 where 0 is set in register FT and then control also passes to L5 where the drive of first display 5 is stopped.

When first case 1 is opened in the state in which the first case is closed and the mode is selected in the direction of rotation of the first case, control passes to step L10 where it is determined that 0 is set in flag FT and that case 1 starts to open. Control then passes to step L11 where 1 is set in flag FT and control then passes to L12 where the drive of the first display starts. At step L13 the mode designated by mode register M is determined. Control then passes to any one of steps L14–L16 where the switching process in the designated mode and the display of the result are performed.

Control then passes to step L17 where it is determined whether second case 8 is open, that is, the output of photosensor 3b is at high level. If so, control passes to step L18 where it is determined whether second display unit 11 is driven. If not, control passes to L19 where second display unit 11 starts to be driven. Control then passes to step L20 where it is determined whether the switching process of second switch unit 30 has been operated. If so, control passes to step L21 where a required switching operation of second switch unit 30 is performed. Control then passes to step L22 where required display processing of second display unit 11 is performed. Thereafter, while the first case 1 is open, the processing at steps L10– L22 is iterated.

As mentioned above, since in the fourth embodiment the first case is adapted to be opened in a plurality of directions, data to be displayed is designated in accordance with that direction of opening, a troublesome keying-in operation to designate data to be displayed is not required.

We claim:

1. An electronic device comprising:
    a base case having an arced guide thereon and provided with an input key unit on an upper surface of said base case; a
    first openable case attached to said base case so as to be freely opened and closed, said first openable case being stacked on said base case when closed, and said first openable case being provided with an electro-optical display unit;
    a second openable case provided with an electro-optical display unit;
    a moving member, movably engaged with the arced guide on said base case, for connecting said second openable case to said base case such that said openable case is freely openable and closable over said base case, wherein said second openable case is movable to several positions along the arced guide together with movement of said moving member and being freely openable and closable over said base case at said several positions;
    position detecting means for detecting which position of said several positions said second openable case is located at when said second openable case is closed over said base case; and
    display control means for allowing different data to be displayed on the electro-optical display unit of said second openable case in accordance with an output of said position detecting means, when said second openable case is open.

2. An electronic device according to claim 1, further comprising:
    opening/closing detection means for judging which one of said first and said second openable cases is open; and
    display drive control means for starting driving of the electro-optical display unit of the openable case which said opening/closing detection means judges as being open, and for stopping driving of the electro-optical display unit of another openable case overlying the open openable case.

3. An electronic device according to claim 1, wherein one of said first and second openable cases is arranged so as to be open in a different direction from that of the other of said first and second openable cases.

4. An electronic device according to claim 3, further comprising:
    horizontal angle adjusting means for causing one of said first and second openable cases to adjustably move perpendicularly to the direction of opening/closing of the openable case.

5. An electronic device according to claim 1, further comprising:
    opening/closing detection means for judging whether or not one of said first and second openable cases is open; and
    display drive control means for driving the electro-optical display unit of the openable case which said opening/closing detection means judges as being open.

6. An electronic device according to claim 1, wherein an inner openable case of said openable cases includes a key provided thereon.

7. An electronic device according to claim 1, further comprising time display means provided on an outermost openable case of said openable cases.

8. An electronic device according to claim 1, wherein said base case includes a wrist band for wearing said electronic device on a wrist of a user.

* * * * *